United States Patent
Honda et al.

(10) Patent No.: US 12,179,701 B2
(45) Date of Patent: Dec. 31, 2024

(54) VEHICLE SLOPE APPARATUS

(71) Applicant: AISIN CORPORATION, Kariya (JP)

(72) Inventors: Isao Honda, Kariya (JP); Tomoyuki Kato, Kariya (JP); Yuta Murakami, Kariya (JP); Masaki Sugimoto, Kariya (JP); Takanori Sato, Kariya (JP)

(73) Assignee: AISIN CORPORATION, Kariya (JP)

( * ) Notice: Subject to any disclaimer, the term of this patent is extended or adjusted under 35 U.S.C. 154(b) by 327 days.

(21) Appl. No.: 17/732,905

(22) Filed: Apr. 29, 2022

(65) Prior Publication Data

US 2022/0371518 A1   Nov. 24, 2022

(30) Foreign Application Priority Data

May 19, 2021   (JP) ................. 2021-084457

(51) Int. Cl.
| | | |
|---|---|---|
| A01G 3/06 | (2006.01) | |
| A61G 3/06 | (2006.01) | |
| B60R 3/02 | (2006.01) | |

(52) U.S. Cl.
CPC ............... B60R 3/02 (2013.01); A61G 3/061 (2013.01); A61G 3/067 (2016.11)

(58) Field of Classification Search
CPC .......... A61G 3/061; A61G 3/067; B60P 1/431
See application file for complete search history.

(56) References Cited

U.S. PATENT DOCUMENTS

| | | | | |
|---|---|---|---|---|
| 5,305,486 | A * | 4/1994 | Smith | A61G 3/067 14/70 |
| 5,832,555 | A * | 11/1998 | Saucier | B60P 1/431 14/71.1 |
| 6,010,298 | A * | 1/2000 | Cohn | A61G 3/061 414/921 |
| 6,602,041 | B2 * | 8/2003 | Lewis | B60P 1/433 414/921 |
| 6,802,095 | B1 * | 10/2004 | Whitmarsh | B60P 1/433 14/71.3 |
| 6,843,635 | B2 * | 1/2005 | Cohn | B60P 1/433 414/921 |
| 6,860,701 | B2 * | 3/2005 | Kiser | B60P 1/431 414/921 |
| 7,052,227 | B2 * | 5/2006 | Navarro | B60P 1/431 414/537 |
| 7,077,616 | B2 * | 7/2006 | Wagner | B60P 1/431 414/537 |
| 11,097,603 | B1 * | 8/2021 | Lillo | B60J 5/108 |
| 2020/0262326 | A1 | 8/2020 | Honda et al. | |

FOREIGN PATENT DOCUMENTS

| | | |
|---|---|---|
| JP | 2020-131784 A | 8/2020 |
| JP | 2020-180487 A | 11/2020 |

* cited by examiner

*Primary Examiner* — Jonathan Snelting
(74) *Attorney, Agent, or Firm* — Oblon, McClelland, Maier & Neustadt, L.L.P.

(57) ABSTRACT

A vehicle slope apparatus includes a slope plate configured to be moved in a deployment direction so as to be deployed at a lower end of a door opening portion and configured to be moved in a housing direction so as to be housed in a housing portion provided in a vehicle body, and a position holding device configured to hold a position of the slope plate against an external force.

11 Claims, 16 Drawing Sheets

HOUSED STATE

DEPLOYED STATE

US 12,179,701 B2

VEHICLE SLOPE APPARATUS

CROSS REFERENCE TO RELATED APPLICATIONS

This application is based on and claims priority under 35 U.S.C. § 119 to Japanese Patent Application 2021-084457, filed on May 19, 2021, the entire content of which is incorporated herein by reference.

TECHNICAL FIELD

This disclosure relates to a vehicle slope apparatus.

BACKGROUND DISCUSSION

In the related art, a vehicle slope apparatus is known in which a slope plate is deployed at a lower end of a door opening portion. For example, in a vehicle described in JP 2020-131784A (Reference 1), a slope apparatus thereof is provided in a housing box provided under a floor. Further, the slope apparatus in the related art includes a drive source, and moves the slope plate in deployment and housing directions. Accordingly, even when an occupant holding a wheelchair, a stroller, a large carry case, or the like is in the vehicle, it is possible to quickly form a ramp continuous with the door opening portion.

However, in the vehicle, in addition to a driving force applied to the slope plate and a load of a user, an external force may act on the slope plate. Further, the slope plate may be moved by the external force.

SUMMARY

According to an aspect of this disclosure, a vehicle slope apparatus includes a slope plate configured to be moved in a deployment direction so as to be deployed at a lower end of a door opening portion and configured to be moved in a housing direction so as to be housed in a housing portion provided in a vehicle body; and a position holding device configured to hold a position of the slope plate against an external force.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment of a vehicle slope apparatus will be described with reference to the drawings.

Figure 1:
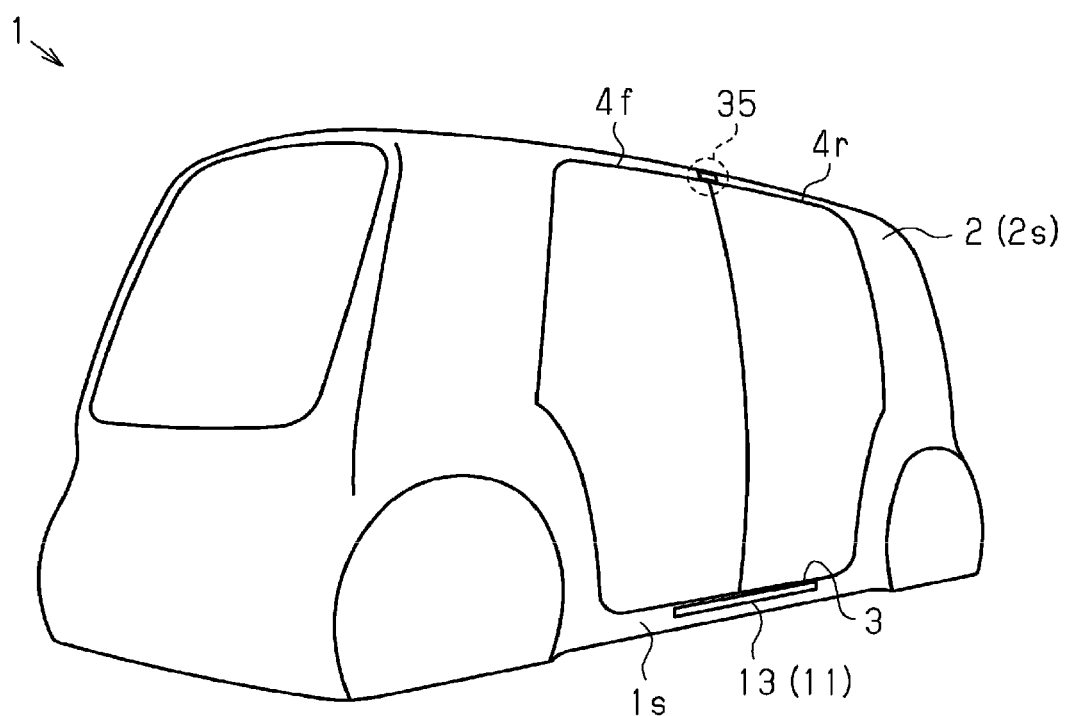
FIG. 1 is a perspective view of a vehicle equipped with a slope apparatus.
Figure 2:
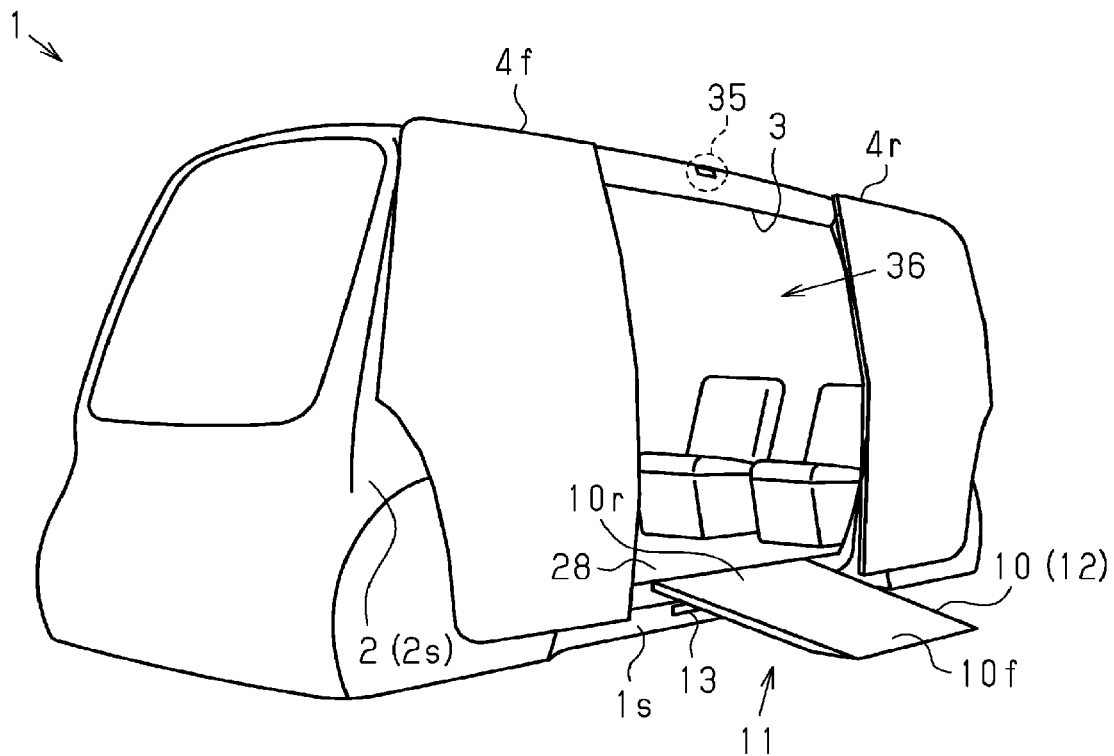
FIG. 2 is a perspective view of the vehicle equipped with the slope apparatus.

As shown in FIGS. 1 and 2, a vehicle 1 according to the present embodiment includes a substantially rectangular box-shaped vehicle body 2 extending in a front-rear direction of the vehicle. In addition, a door opening portion 3, which serves as an entrance and exit for an occupant, is provided on a side surface 2s of the vehicle body 2. The door opening portion 3 is provided with a pair of slide doors 4f, 4r that perform opening/closing operations in opposite directions in the front-rear direction of the vehicle.

That is, the slide door 4f on a front side of the vehicle is moved to the front side of the vehicle so as to perform the opening operation, and is moved to a rear side of the vehicle so as to perform the closing operation. On the other hand, the slide door 4r on the rear side of the vehicle is moved to the rear side of the vehicle so as to perform the opening operation, and is moved to the front side of the vehicle so as to perform the closing operation. Further, each of the slide doors 4f, 4r has a configuration as a power slide door device that performs the opening and closing operations based on a driving force of an actuator (not shown). The vehicle 1 according to the present embodiment is configured to open and close the door opening portion 3 such that the slide doors 4f, 4r are moved in conjunction.

The vehicle 1 according to the present embodiment includes a slope apparatus 11 that deploys a slope plate 10 at a lower end of the door opening portion 3 when the door opening portion 3 is in an opened state. In the vehicle 1 according to the present embodiment, even when an occupant holds, for example, a wheelchair, a stroller, a carry case or the like, the occupant can easily get on or off the vehicle from the door opening portion 3 by using a ramp 12 formed by the slope plate 10.

Figure 3:
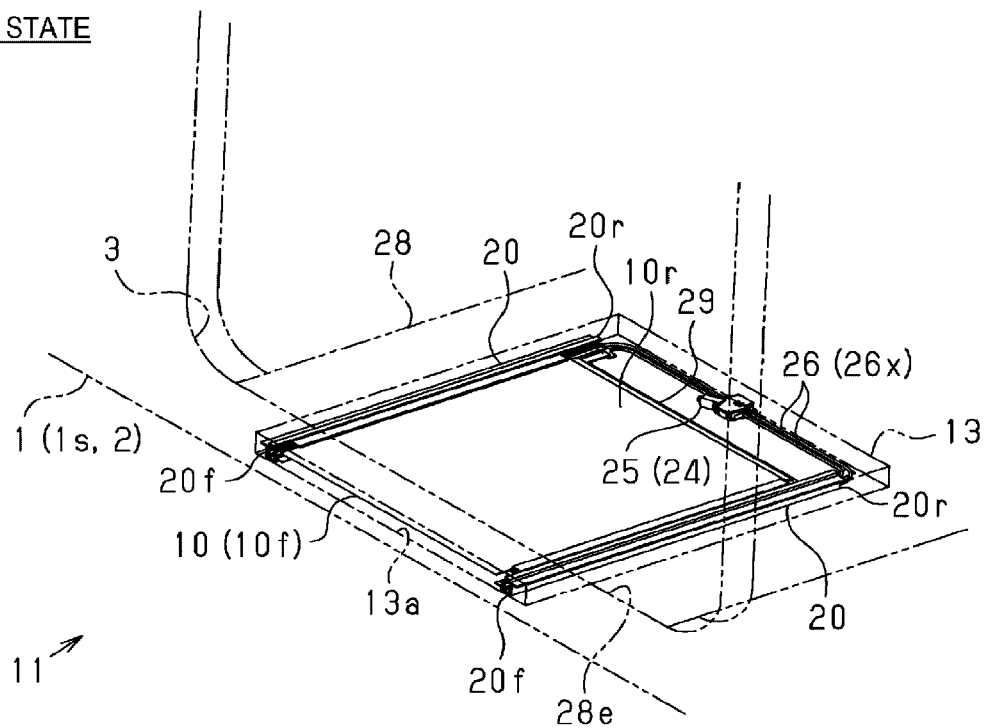
FIG. 3 is a perspective view of the slope apparatus provided below a door opening portion.
Figure 4:
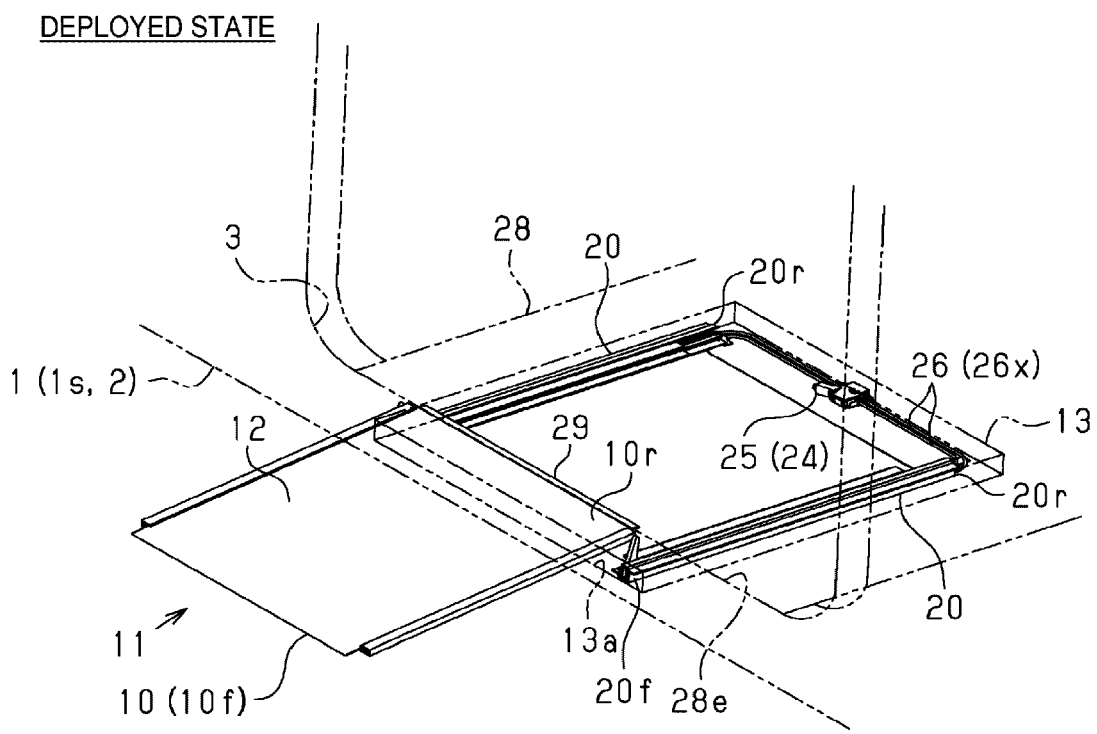
FIG. 4 is a perspective view of the slope apparatus provided below the door opening portion.

As shown in FIGS. 3 and 4, in the vehicle 1 according to the present embodiment, the slope apparatus 11 is provided in a housing box 13 as a housing portion provided in the vehicle body 2 below the door opening portion 3. Specifically, the housing box 13 includes an opening portion 13a facing the same direction as the door opening portion 3. In the slope apparatus 11 according to the present embodiment, via the opening portion 13a, the slope plate 10 housed in the housing box 13 is deployed to the outside of the vehicle, and the deployed slope plate 10 is housed into the housing box 13 again.

In detail, the slope apparatus 11 according to the present embodiment includes a pair of guide rails 20, 20 extending from the housing box 13 in deployment and housing directions of the slope plate 10 deployed at the lower end of the door opening portion 3, that is, in a depth direction in the housing box 13.

Figure 5:
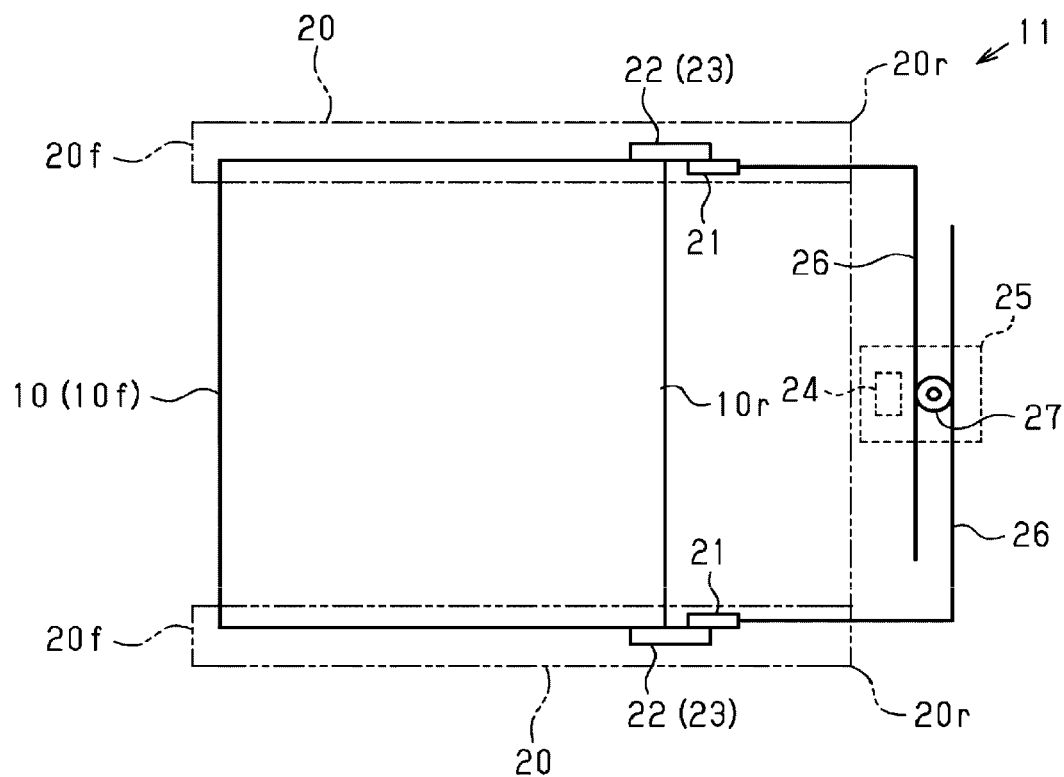
FIG. 5 is a schematic configuration diagram of the slope apparatus.

As shown in FIGS. 3 to 5, in the slope apparatus 11 according to the present embodiment, the guide rails 20, 20 are disposed substantially in parallel such that the guide rails 20, 20 sandwich the slope plate 10 in the housing box 13 from both sides in a width direction. In addition, the slope apparatus 11 according to the present embodiment includes a pair of moving members 21, 21 that are provided so as to be slidable to be engaged with the guide rails 20, 20 along an extending direction of the engaged guide rails 20, 20. In addition, the slope apparatus 11 includes a pair of support arms 22, 22 that are rotatably connected to a rear end 10r of the slope plate 10 and are rotatably connected to the moving members 21. That is, in the slope apparatus 11 according to the present embodiment, the support arms 22, 22 form a connecting mechanism 23 between the slope plate 10 and the moving members 21, 21. Accordingly, the slope plate 10 is moved in the deployment and housing directions in conjunction with the moving members 21, 21.

Further, the slope apparatus 11 according to the present embodiment includes an actuator 25 that uses a motor 24 as a drive source and applies a driving force to the slope plate 10. In the slope apparatus 11 according to the present embodiment, the actuator 25 is disposed in the housing box 13 deeper than rear ends 20r of the guide rails 20, 20. Further, the slope apparatus 11 according to the present embodiment includes a pair of drive cables 26, 26 that are routed along the extending direction of the guide rails 20, 20. In the slope apparatus 11 according to the present embodiment, the drive cables 26, 26 are routed from the actuator 25 to the rear ends 20r of the guide rails 20, 20 by being inserted into casing pipes 26x, 26x. In the slope apparatus 11 according to the present embodiment, the moving members 21, 21 are moved along the extending direction of the guide rails 20, 20 based on the driving force of the actuator 25 transmitted via the drive cables 26, 26.

Specifically, the actuator 25 according to the present embodiment includes a drive gear 27 that rotates based on a driving force generated by the motor 24. Further, the actuator 25 is configured such that the drive cables 26, 26 mesh with the drive gear 27 at two positions sandwiching the drive gear 27 in a radial direction thereof. That is, the actuator 25 according to the present embodiment slides the drive cables 26, 26 along the extending direction of the guide rails 20, 20 by rotating the drive gear 27. Further, in the slope apparatus 11 according to the present embodiment, the moving members 21, 21 are connected to end portions of the drive cables 26, 26. Accordingly, in the slope apparatus 11 according to the present embodiment, the moving members 21, 21 slide integrally with the drive cables 26, 26 in the deployment and housing directions of the slope plate 10 in a state where the moving members 21, 21 are guided by the guide rails 20, 20.

Figure 6:
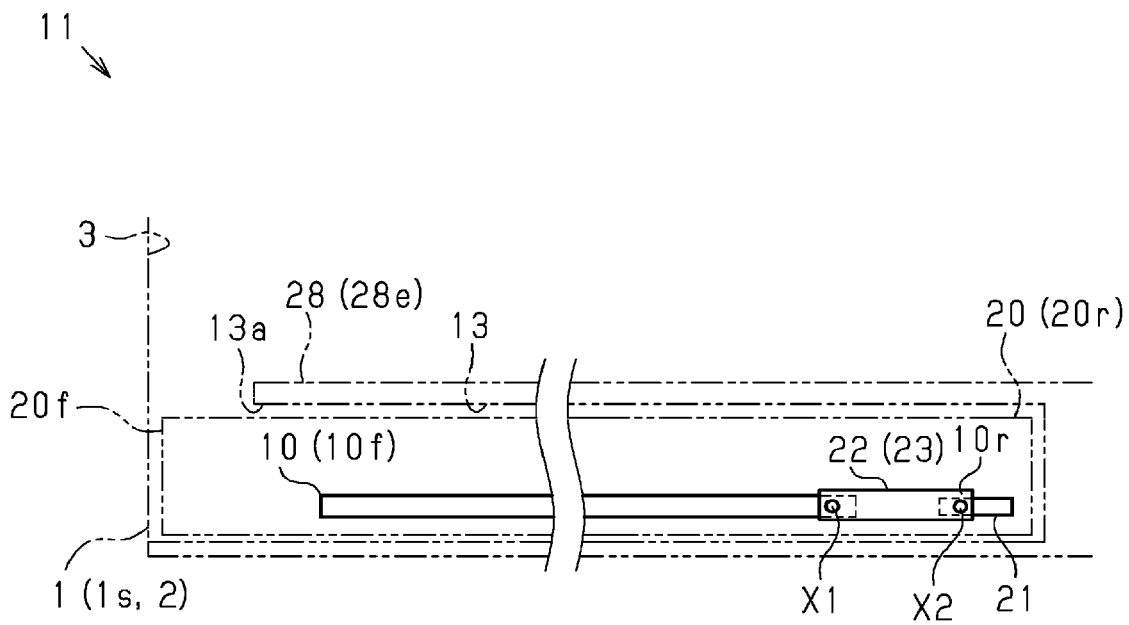
FIG. 6 is a diagram illustrating an operation of the slope apparatus.
Figure 7:
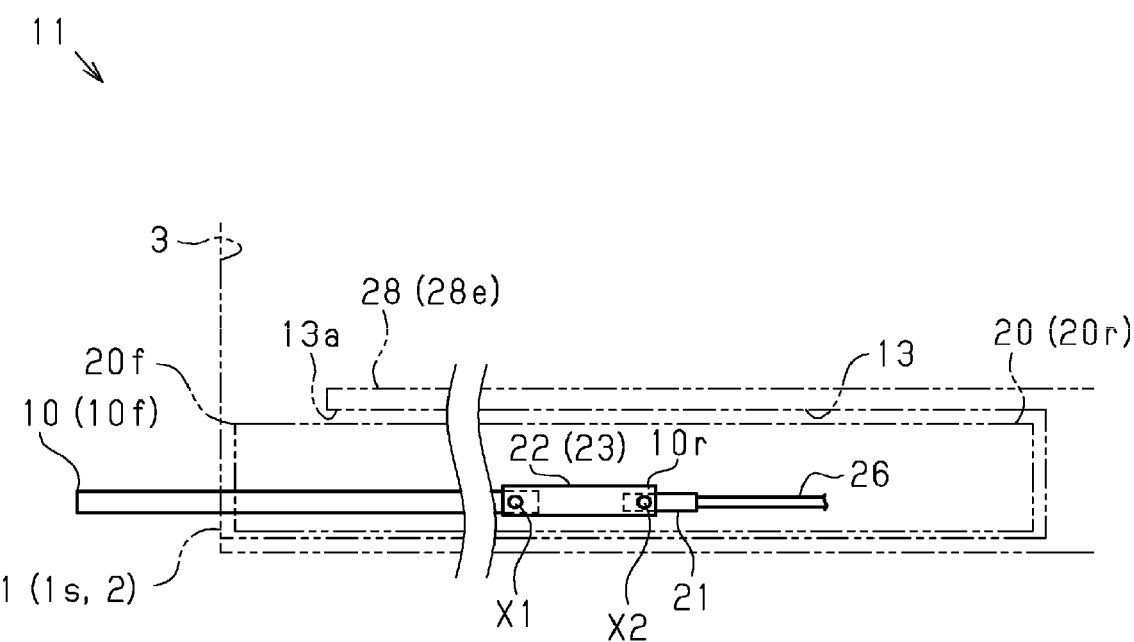
FIG. 7 is a diagram illustrating an operation of the slope apparatus.

In detail, as shown in FIGS. 6 and 7, in the slope apparatus 11 according to the present embodiment, the slope plate 10 is housed in the housing box 13, in a state where a substantially horizontal posture is maintained, based on the engagement force of the moving members 21 and the support arms 22 with respect to the guide rails 20. Further, in the slope apparatus 11 according to the present embodiment, the slope plate 10 moves in the deployment and housing directions integrally with the moving members 21 and the support arms 22 along the extending direction of the guide rails 20 while maintaining the substantially horizontal posture.

Figure 8:
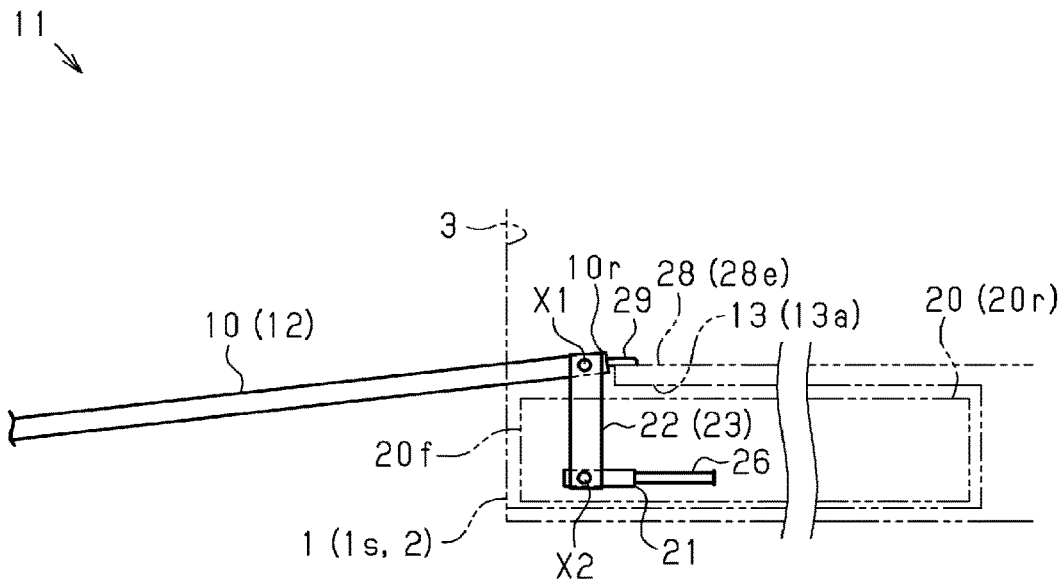
FIG. 8 is a diagram illustrating an operation of the slope apparatus.

As shown in FIG. 8, in the slope apparatus 11 according to the present embodiment, the slope plate 10 is deployed to the outside of the vehicle to extend outward in a vehicle width direction from a side edge portion 1s of the vehicle 1 provided with the housing box 13. Further, in the slope apparatus 11 according to the present embodiment, in this state, the support arms 22 interposed between the moving members 21 and the slope plate 10 rotates to lift up the rear end 10r of the slope plate 10. Accordingly, in the slope apparatus 11 according to the present embodiment, the slope plate 10 forms the ramp 12 in a state where the rear end 10r is brought closer to a vehicle floor 28.

In the slope apparatus 11 according to the present embodiment, a floor engagement portion 29 is provided at the rear end 10r of the slope plate 10. Further, in the slope apparatus 11 according to the present embodiment, the floor engagement portion 29 is engaged with an edge portion 28e of the vehicle floor 28, and thus the vehicle floor 28 supports a load of the slope plate 10.

Figure 9:
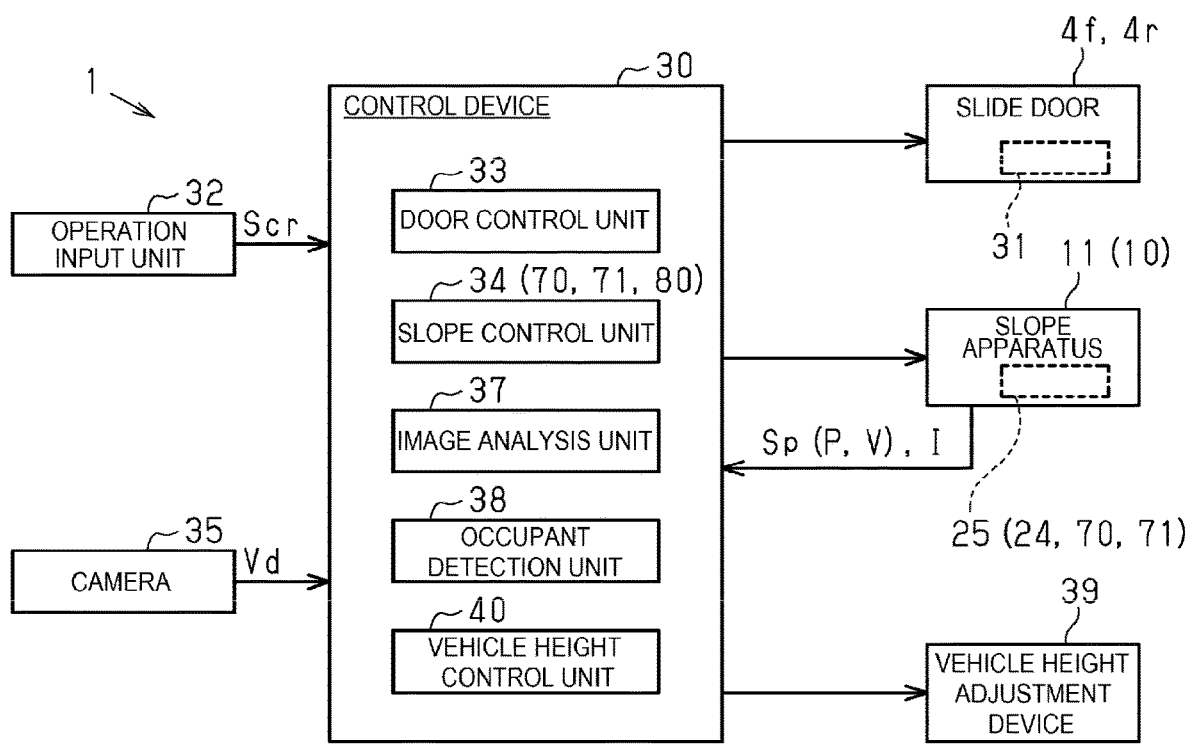
FIG. 9 is a control block diagram of the vehicle equipped with the slope apparatus.

As shown in FIG. 9, in the vehicle 1 according to the present embodiment, operations of the actuator 25 of the slope apparatus 11 are controlled by a control device 30. Operations of an actuator 31 for the slide doors 4f, 4r having a configuration as the power slide door device are also controlled by the control device 30.

Specifically, an operation input signal Scr for an operation input unit 32 provided in the vehicle 1, such as a driver seat (not shown), is input to the control device 30 according to the present embodiment. That is, in the vehicle 1 according to the present embodiment, as the operation input signal Scr, an operation request for the slide doors 4f, 4r and an operation request for the slope apparatus 11 issued by a driver of the vehicle 1 are input to the control device 30. Further, the control device 30 according to the present embodiment includes a door control unit 33 that controls the opening and closing operations of the slide doors 4f, 4r based on the operation requests, and a slope control unit 34 that controls deployment and housing operations of the slope plate 10 based on the operation requests.

A pulse signal Sp synchronized with an operation of the actuator 25 is input to the control device 30 according to the present embodiment. Further, the control device 30 detects a moving position P and a moving speed V of the slope plate 10 by counting the pulse signal Sp. Then, the slope control unit 34 according to the present embodiment is configured to execute a drive control of the slope plate 10 by acquiring the moving position P and the moving speed V.

In addition, as shown in FIGS. 1, 2 and 9, an captured image Vd outside the vehicle, which is captured by a camera 35 provided in the vehicle 1, is input to the control device 30 according to the present embodiment. In the vehicle 1 according to the present embodiment, the camera 35 is provided, for example, above the door opening portion 3 and is also provided in a vehicle interior 36. Further, the control device 30 according to the present embodiment includes an image analysis unit 37 that analyzes the captured images Vd of the cameras 35, and an occupant detection unit 38 that detects, based on a result of the image analysis, an occupant of the vehicle 1 who uses the door opening portion 3. The control device 30 according to the present embodiment has a function of automatically opening and closing the slide doors 4f, 4r based on a result of the occupant detection, and deploying and housing the slope apparatus 11 in conjunction with the slide doors 4f, 4r.

Further, the control device 30 according to the present embodiment includes a vehicle height control unit 40 that controls operations of a vehicle height adjustment device 39 provided in the vehicle 1. Accordingly, in the vehicle 1 according to the present embodiment, it is possible to adjust a vehicle height in conjunction with the opening/closing operations of the slide doors 4f, 4r and the deployment and housing operations of the slope apparatus 11.

Position Holding Device of Slope Plate

Next, a position holding device 70 of the slope plate 10 mounted in the slope apparatus 11 according to the present embodiment will be described.

Figure 10:
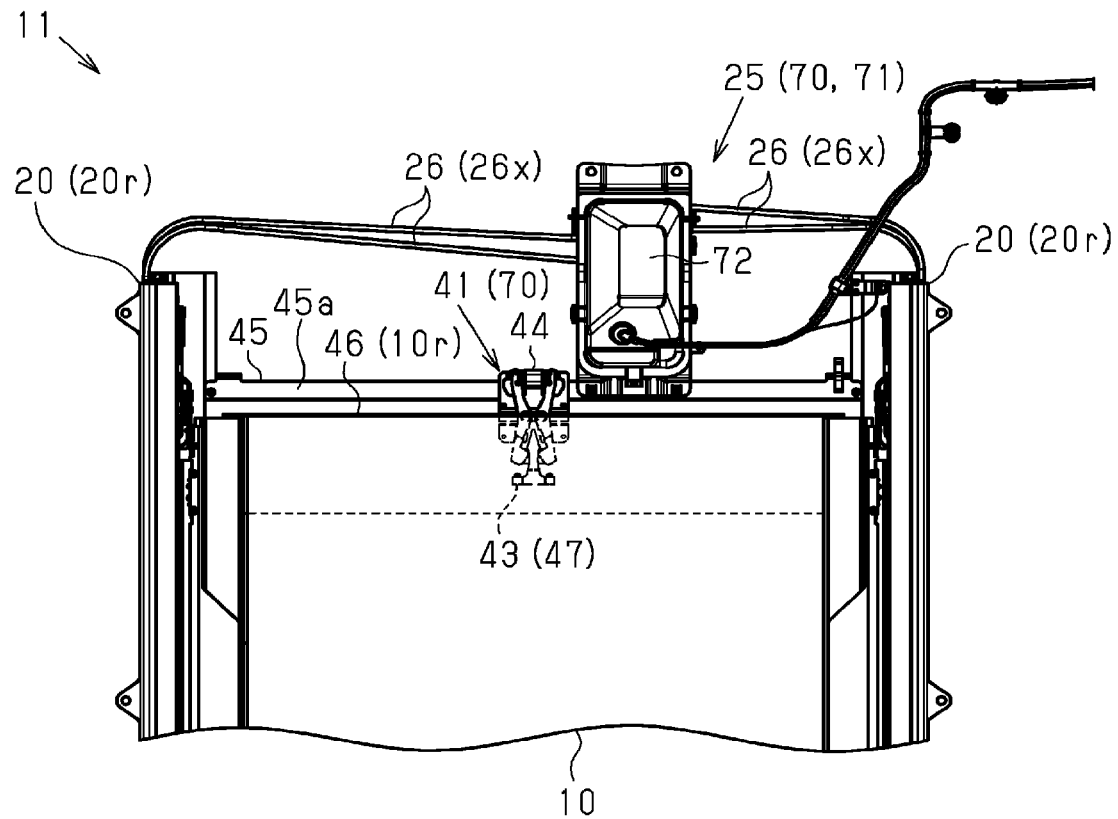
FIG. 10 is a plan view of the slope apparatus.

As shown in FIG. 10, the slope apparatus 11 according to the present embodiment includes a check mechanism 41 that holds the slope plate 10 in a position where the slope plate 10 is housed in the housing box 13 provided in the vehicle body 2, that is, in a state where the housing of the slope plate 10 is completed (see FIG. 3).

Figure 11:
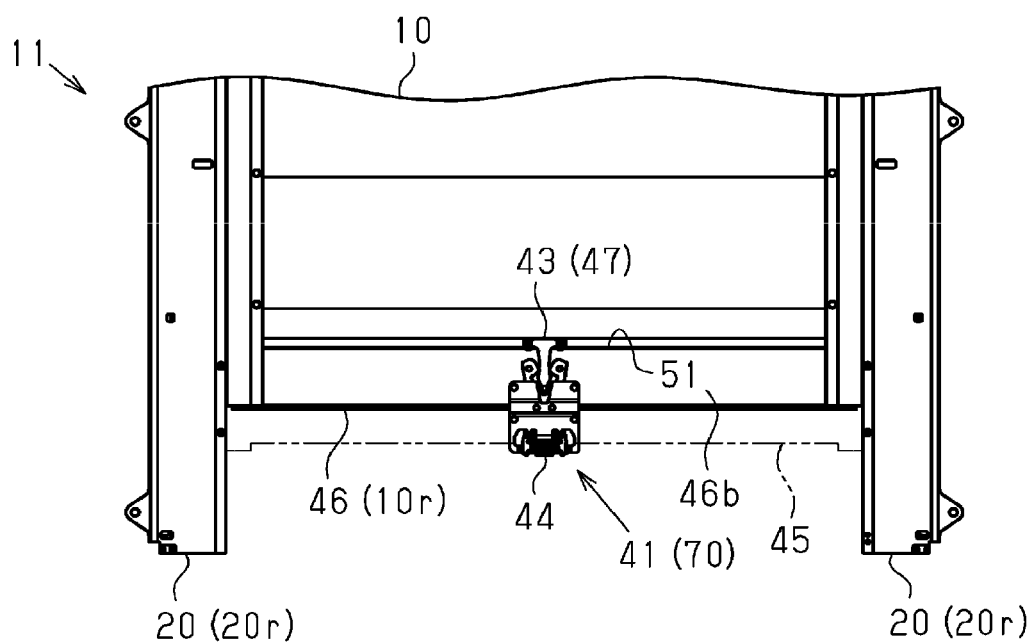
FIG. 11 is a bottom view of the slope apparatus.

In detail, as shown in FIGS. 10 and 11, the check mechanism 41 according to the present embodiment includes a slope side check 43 provided on the slope plate 10 and a vehicle body side check 44 provided on the vehicle body 2. Further, in the slope apparatus 11 according to the present embodiment, the slope side check 43 and the vehicle body side check 44 are engaged with each other at the position where the slope plate 10 is housed in the housing box 13. In the check mechanism 41 according to the present embodiment, the slope plate 10 is held at the position where the slope plate 10 is housed in the housing box 13 based on an engagement force between the slope side check 43 and the vehicle body side check 44.

In the slope apparatus 11 according to the present embodiment, the slope side check 43 is provided on the rear end 10r of the slope plate 10. Further, the vehicle body side check 44 is provided on a connection frame 45 that connects the vicinity of the rear ends 20r of the guide rails 20, 20 so as to extend in a width direction of the slope plate 10. That is, in the slope apparatus 11 according to the present embodiment, the vehicle body side check 44 is immovably fixed to the vehicle body 2 via the connection frame 45 and the guide rails 20, 20. In the slope apparatus 11 according to the present embodiment, the actuator 25 is also fixed to the connection frame 45.

In more detail, as shown in FIGS. 11 to 14, in the slope apparatus 11 according to the present embodiment, the slope side check 43 is formed by fixing a check member 47 to a lower surface 46b of an end panel 46 constituting the rear end 10r of the slope plate 10. Specifically, the check member 47 according to the present embodiment includes a base portion 48 having a substantially square pillar shape, and an engagement protrusion 50 extending in a direction orthogonal to the base portion 48. The lower surface 46b of the end panel 46 is provided with a fitting groove 51 extending in the width direction (a left-right direction in FIG. 11, an up-down direction in FIG. 14) of the slope plate 10. Further, the check member 47 according to the present embodiment is fixed to the lower surface 46b of the end panel 46 in a state where the base portion 48 is fitted to the fitting groove 51. Accordingly, in the slope apparatus 11 according to the present embodiment, the slope side check 43, which is provided with the engagement protrusion 50 protruding in the housing direction (lower side in FIG. 11, right side in FIGS. 13 and 14), is formed on the rear end 10r of the slope plate 10.

Figure 12:
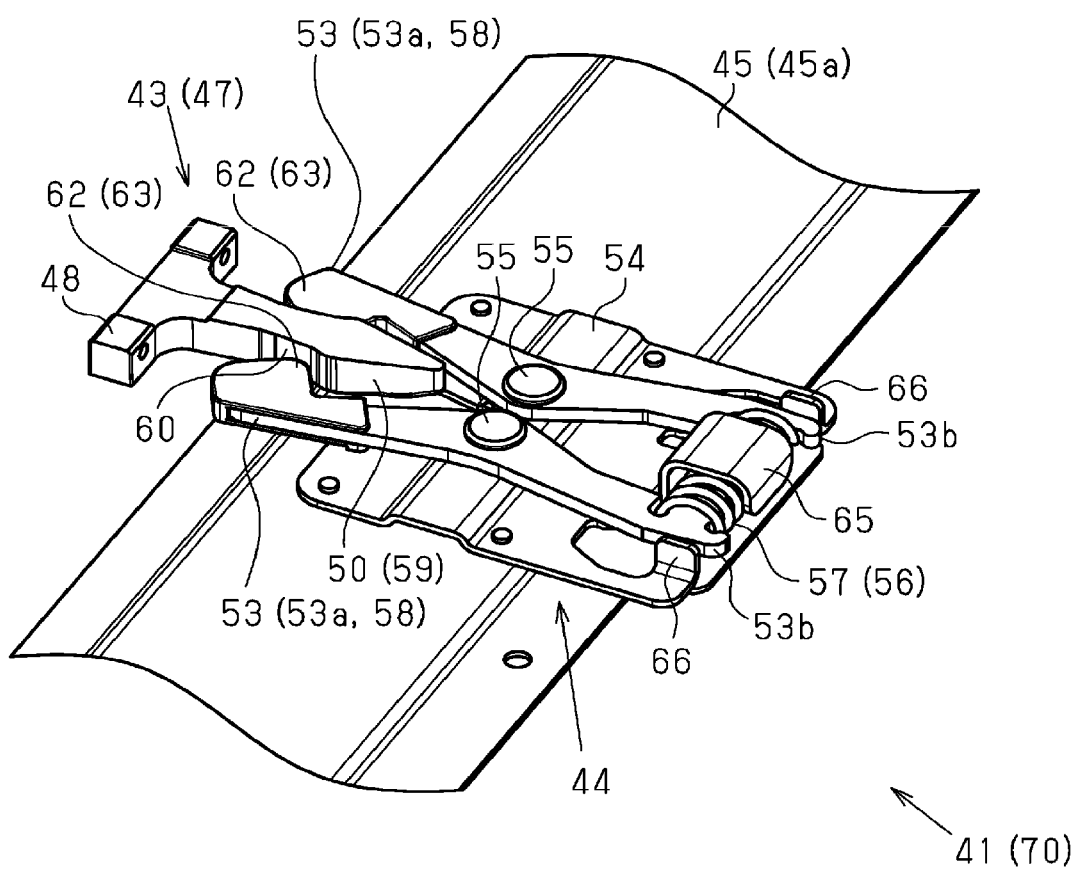
FIG. 12 is a perspective view of a check mechanism.
Figure 13:
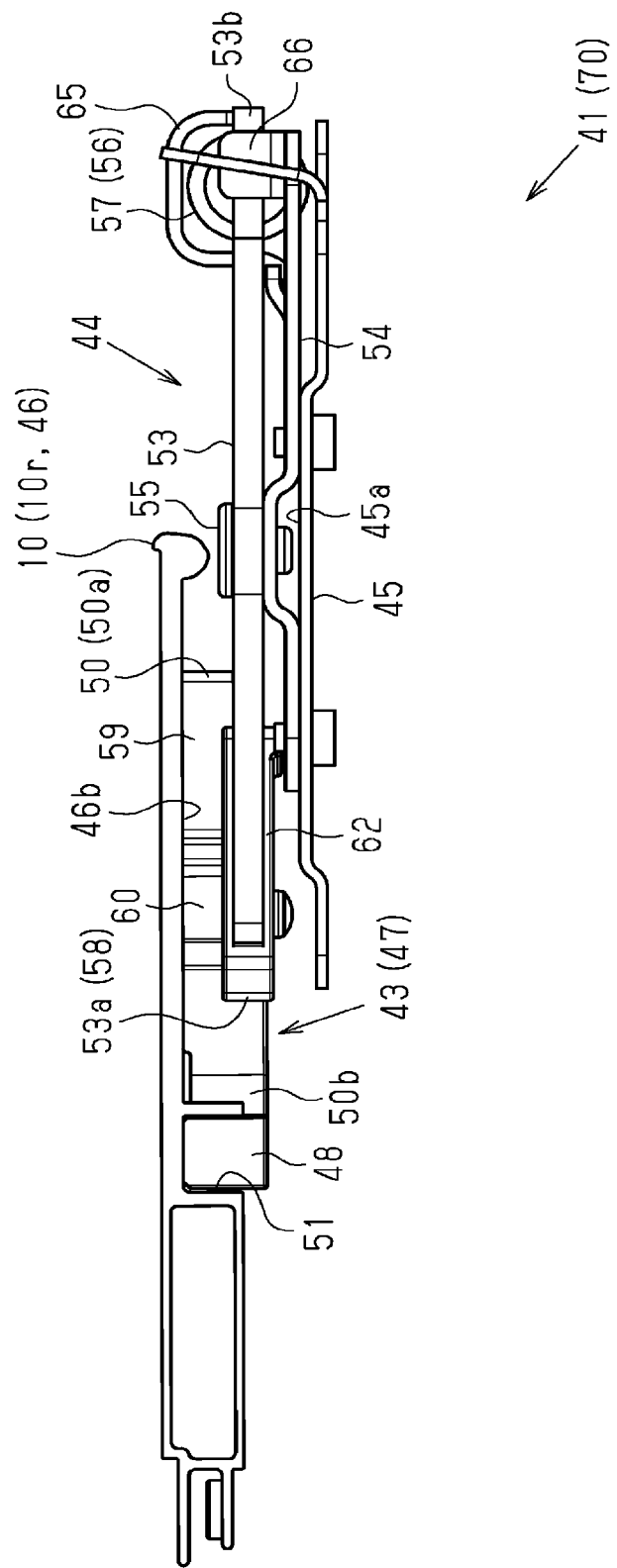
FIG. 13 is a side view of the check mechanism.
Figure 14:
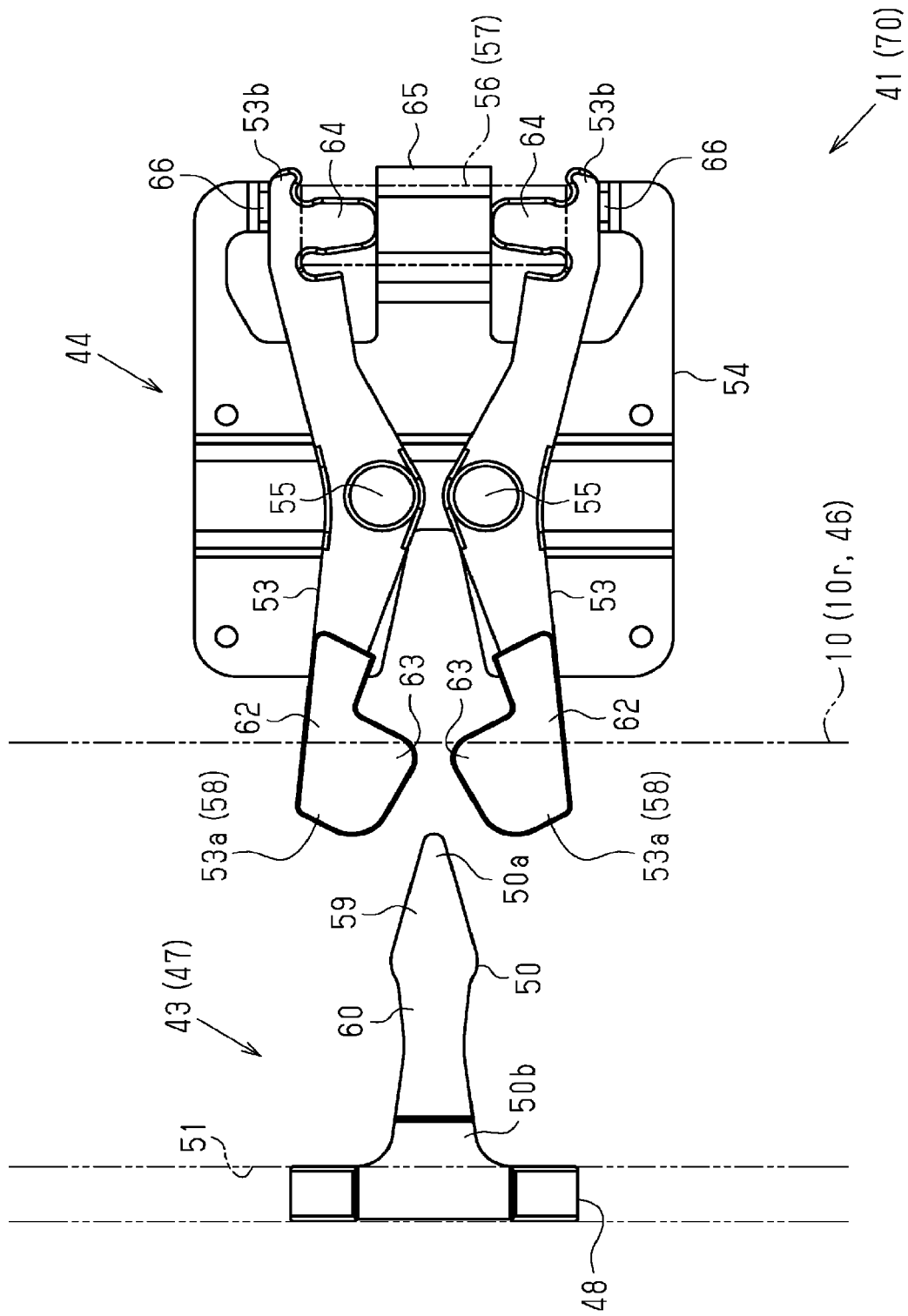
FIG. 14 is a plan view of the check mechanism.

As shown in FIGS. 12 to 14, in the slope apparatus 11 according to the present embodiment, the vehicle body side check 44 includes a pair of lever members 53, 53 that are disposed adjacently and rotatably to extend in the deployment and housing directions (left-right direction in FIGS. 13 and 14) of the slope plate 10. Specifically, the vehicle body side check 44 according to the present embodiment includes a base plate 54 fixed to an upper surface 45a of the connection frame 45 having a substantially flat plate shape, and a pair of support shafts 55, 55 erected on the base plate 54. Further, in the vehicle body side check 44 according to the present embodiment, since the base plate 54 is fixed to the connection frame 45, the support shafts 55, 55 are disposed adjacently in a longitudinal direction of the connection frame 45, that is, in the width direction of the slope plate 10. The lever members 53, 53 are pivotally supported by the support shafts 55, 55, and thus independent rotation of the lever members 53, 53 respectively around the support shafts 55, 55 is allowed.

In the vehicle body side check 44 according to the present embodiment, first end portions 53a, 53a of the lever members 53, 53 are disposed in the deployment direction of the slope plate 10 (left side in FIGS. 13 and 14), respectively. Further, the vehicle body side check 44 according to the present embodiment includes an urging member 56 that urges the lever members 53, 53 to rotate the lever members 53, 53 in a direction where the first end portions 53a, 53a are close to each other.

Specifically, the vehicle body side check 44 according to the present embodiment includes a compression coil spring 57 interposed between second end portions 53b, 53b of the lever members 53, 53. That is, in the vehicle body side check 44 according to the present embodiment, the compression coil spring 57 generates an elastic force in a direction that separates the second end portions 53b, 53b of the lever members 53, 53 from each other. Further, the lever members 53, 53 rotate in opposite directions based on the elastic force of the compression coil spring 57. Accordingly, in the vehicle body side check 44 according to the present embodiment, the compression coil spring 57 is used as the urging member 56 to rotate and urge the lever members 53, 53 in a direction where the first end portions 53a, 53a are close to each other.

In the slope side check 43 according to the present embodiment, the engagement protrusion 50 of the check member 47 constituting the slope side check 43 is disposed at a position between the lever members 53, 53 constituting the vehicle body side check 44 in the width direction of the slope plate 10.

Specifically, as shown in FIGS. 10 and 11, the check member 47 according to the present embodiment is fixed to the end panel 46 constituting the rear end 10r at a substantially central position in the width direction of the slope plate 10. Further, the base plate 54 of the vehicle body side check 44 is also fixed to a substantially central portion in a longitudinal direction of the connection frame 45 located at a substantially central position in the width direction of the slope plate 10.

As shown in FIG. 13, in the slope apparatus 11 according to the present embodiment, a gap in a height direction (up-down direction in FIG. 13) is formed between the end panel 46 and the connection frame 45 at the position where the slope plate 10 is housed in the housing box 13. In the state where the housing of the slope plate 10 is completed, the slope side check 43 provided on the lower surface 46b of the end panel 46 and the vehicle body side check 44 provided on the upper surface 45a of the connection frame 45 are disposed at substantially the same height position. Accordingly, in the check mechanism 41 according to the present embodiment, based on the movement of the slope plate 10 toward the housing direction, the slope side check 43 that moves integrally with the slope plate 10 and the vehicle body side check 44 fixed to the vehicle body 2 are engaged with each other.

Figure 15:
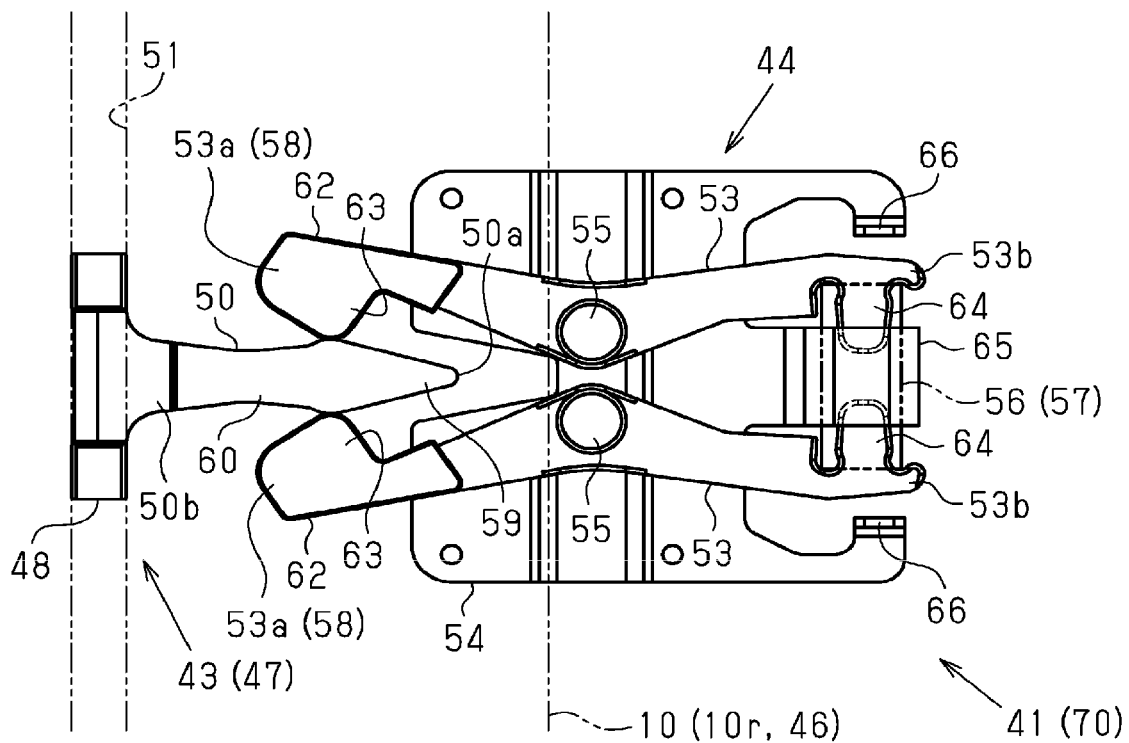
FIG. 15 is a plan view of the check mechanism.
Figure 16:
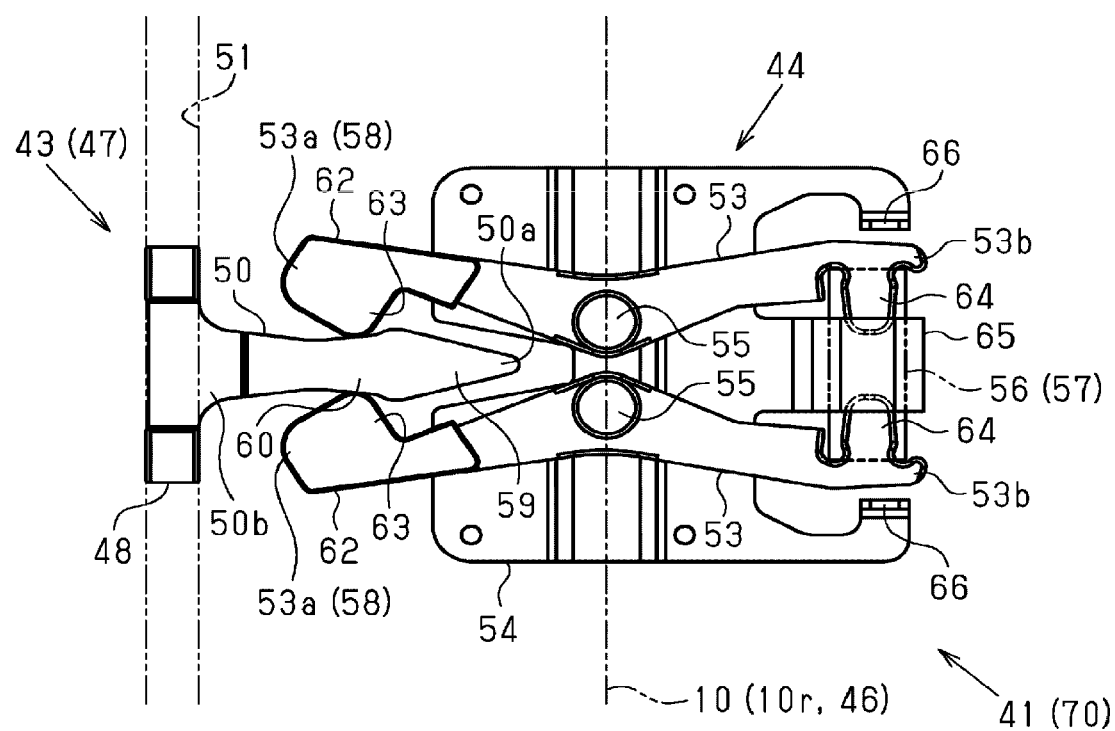
FIG. 16 is a plan view of the check mechanism.

That is, as shown in FIGS. 14 to 16, in the check mechanism 41 according to the present embodiment, the engagement protrusion 50 of the check member 47 constituting the slope side check 43 is inserted between the first end portions 53a, 53a of the lever members 53, 53 constituting the vehicle body side check 44. Further, the engagement protrusion 50 inserted between the first end portions 53a, 53a is sandwiched by the lever members 53, 53 based on the urging force of the compression coil spring 57 constituting the urging member 56. Accordingly, in the check mechanism 41 according to the present embodiment, the first end portions 53a, 53a are used as engagement portions 58, 58 of the lever members 53, 53, and the lever members 53, 53 and the engagement protrusion 50 of the check member 47 are engaged with each other.

In more detail, in the check mechanism 41 according to the present embodiment, the check member 47 constituting the slope side check 43 has a wedge-shaped portion 59 that gradually increases in width from a tip end 50a of the engagement protrusion 50 toward a base end 50b. Further, the check member 47 is provided with a constricted portion 60 that is continuous with the wedge-shaped portion 59 and gradually narrows in width. The check member 47 according to the present embodiment is fixed on the lower surface 46b of the end panel 46 in a state where a width direction of the wedge-shaped portion 59 provided at the tip end 50a of the engagement protrusion 50 coincides with the width direction of the slope plate 10.

The vehicle body side check 44 according to the present embodiment includes cover members 62, 62 provided at the first end portions 53a, 53a constituting the engagement portions 58, 58 of the lever members 53, 53. In the vehicle body side check 44 according to the present embodiment, the lever members 53, 53 are formed of metal. The cover members 62, 62 are formed of resin. The cover members 62, 62 are fixed to the lever members 53, 53 to cover the first end portions 53a, 53a, respectively.

Protruding portions 63, 63 that protrude in a direction toward each other are formed on the cover members 62, 62, for the respective first end portions 53a, 53a constituting the engagement portions 58, 58 of the lever members 53, 53. Further, in the lever members 53, 53 according to the present embodiment, the engagement protrusion 50 of the check member 47, which moves in the housing direction together with the slope plate 10, abuts against the protruding portions 63, 63.

That is, as shown in FIG. 15, in the check member 47 according to the present embodiment, the wedge-shaped portion 59 of the engagement protrusion 50 inserted between the first end portions 53a, 53a constituting the engagement portions 58, 58 of the lever members 53, 53 gradually pushes and expands a gap between the first end portions 53a, 53a. Accordingly, in the check mechanism 41 according to the present embodiment, the lever members 53, 53, which are pressed against the check member 47 based on the driving force for moving the slope plate 10 in the housing direction, rotate smoothly against the urging force of the compression coil spring 57.

As shown in FIG. 16, the check member 47 is further moved in the housing direction, and thus the protruding portions 63, 63 provided on the engagement portions 58, 58 of the lever members 53, 53 are engaged with the constricted portion 60, which is provided closer to the base end 50b side of the engagement protrusion 50 than the wedge-shaped portion 59. That is, since a wide portion of the wedge-shaped portion 59 is located closer to a tip end 50a side of the engagement protrusion 50 than the constricted portion 60 to be engaged with the protruding portions 63, 63, a force required to move the engagement protrusion 50 in the deployment direction against the compression coil spring 57 increases. Then, the check mechanism 41 according to the present embodiment holds the slope plate 10 at the position where the slope plate 10 is housed in the housing box 13 based on the engagement force between the slope side check 43 and the vehicle body side check 44 generated due to the above arrangement.

As shown in FIGS. 12 and 14, in the check mechanism 41 according to the present embodiment, the second end portions 53b, 53b of the lever members 53, 53 are respectively provided with holding protrusions 64, 64 that protrude in facing directions. The compression coil spring 57 constituting the urging member 56 is interposed between the second end portions 53b, 53b of the lever members 53, 53 in a state where the holding protrusions 64, 64 are inserted into both ends in an axis direction of the compression coil spring 57.

The base plate 54 according to the present embodiment is provided with a holding piece 65 that sandwiches the compression coil spring 57 with the connecting frame 45 in a state where the compression coil spring 57 is interposed between the second end portions 53b, 53b of the lever members 53, 53. Specifically, the holding piece 65 has a U-shaped cross sectional shape extending along a circumferential direction of the compression coil spring 57. Accordingly, in the vehicle body side check 44 according to the present embodiment, the lever members 53, 53 can be stably urged without the compression coil spring 57 being detached.

Further, the base plate 54 according to the present embodiment includes a pair of stopper portions 66, 66 that abuts with the second end portions 53b, 53b of the lever members 53, 53 so as to restrict movement in directions away from each other caused by the urging force of the compression coil spring 57. Accordingly, in the vehicle body side check 44 according to the present embodiment, a gap between the first end portions 53a, 53a of the lever members 53, 53 in a non-engagement state is kept constant.

In the vehicle body side check 44 according to the present embodiment, the lever members 53, 53 rotate independently around the support shafts 55, 55, respectively. Accordingly, even if a positional deviation in the width direction of the slope plate 10 is generated when the engagement protrusion 50 of the check member 47 is inserted between the first end portions 53a, 53a of the lever members 53, 53, the positional deviation can be absorbed.

At this time, one of the second end portions 53b, 53b of the lever members 53, 53 sandwiching the compression coil spring 57 abuts with the stopper portion 66 provided on the base plate 54. Accordingly, the check mechanism 41 according to the present embodiment has a function of autonomously correcting, based on the elastic force of the compression coil spring 57, the positional deviation generated between the slope side check 43 and the vehicle body side check 44.

As shown in FIG. 9, in the vehicle 1 according to the present embodiment, the slope control unit 34 provided in the control device 30 controls operations of the slope apparatus 11 through supply of drive power to the motor 24 which is the drive source of the actuator 25. Then, the slope control unit 34 according to the present embodiment monitors a current change in the motor 24 during housing control of the slope plate 10. Accordingly, in the slope apparatus 11 according to the present embodiment, it is detected that the check mechanism 41 configured as described above has shifted to the engagement state where an engagement force for holding the slope plate 10 at the position where the slope plate 10 is housed in the housing box 13 is generated.

Figure 17:
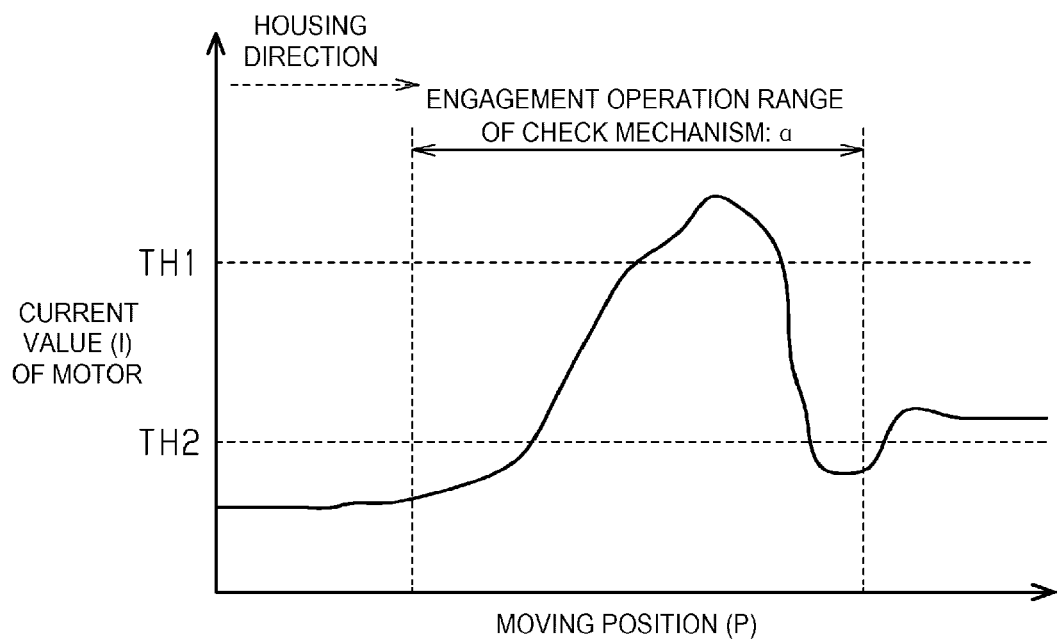
FIG. 17 is a graph showing a current change in a motor caused by an engagement operation of the check mechanism.

That is, as shown in FIGS. 15 to 17, when the slope side check 43 is engaged with the vehicle body side check 44 due to the movement of the slope plate 10 toward the housing direction, the lever members 53, 53 rotate against the urging force of the compression coil spring 57. Therefore, at this time, the actuator 25 is required to provide a larger driving force than when the slope plate 10 is driven in a no-load state. Accordingly, a current value I of the motor 24 that is the drive source of the actuator 25 increases. The slope control unit 34 according to the present embodiment detects the shift to the engagement state by detecting the current change in the motor 24 caused by such an engagement operation of the check mechanism 41.

Figure 18:
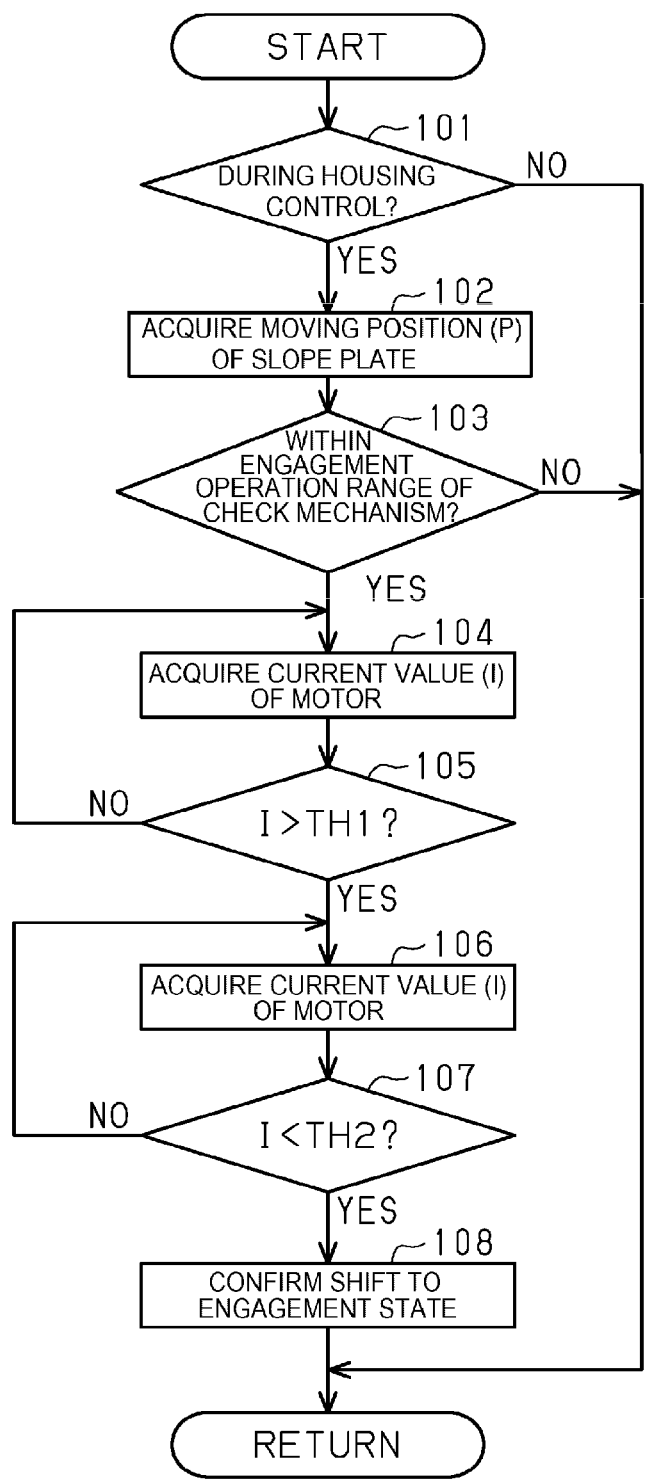
FIG. 18 is a flowchart showing a processing procedure of an engagement confirmation control of the check mechanism based on the current change in the motor.

Specifically, as shown in FIG. 18, the slope control unit 34 according to the present embodiment first acquires the moving position P of the slope plate 10 (step 102) during the housing control (step 101: YES). Then, the slope control unit 34 determines whether the moving position P of the slope plate 10 is within an engagement operation range a of the check mechanism 41 (step 103).

Further, the slope control unit 34 acquires the current value I of the motor 24 (step 104) and compares the current value I with a predetermined first threshold value TH1 (step 105) when the moving position P is within the engagement operation range a (step 103: YES). The slope control unit 34 according to the present embodiment repeats the processing of step 104 and step 105 again when the current value I acquired in step 104 is equal to or less than the first threshold value TH1 (I TH1, step 105: NO).

The slope control unit 34 also newly acquires the current value I of the motor 24 (step 106) when the detection of the current value I larger than the first threshold value TH1 is confirmed in step 105 (I>TH1, step 105: YES). Further, the slope control unit 34 compares the current value I of the motor 24 acquired in step 106 with a second threshold value TH2 (step 107). The slope control unit 34 repeats the processing of step 106 and step 107 again when the current value I is equal to or higher than the second threshold value TH2 (I≥TH2, step 107: NO).

The slope control unit 34 according to the present embodiment confirms that the check mechanism 41 has shifted to the engagement state (step 108) when the detection of the current value I smaller than the second threshold value TH2 is confirmed in step 107 (I<TH2, step 107: YES).

That is, as shown in FIGS. 15 to 17, during the engagement operation of the check mechanism 41, the driving force required for the actuator 25 is maximized at a position where the wedge-shaped portion 59 of the engagement protrusion 50 pushes and expands the gap between the first end portions 53a, 53a of the lever members 53, 53 most. Then, in the slope control unit 34 according to the present embodiment, the first threshold value TH1 is set in response to the increase in the current value I generated in the motor 24 at this time.

Thereafter, the wedge-shaped portion 59 of the engagement protrusion 50 that moves in the housing direction passes through the position where the wedge-shaped portion 59 pushes and expands the gap between the first end portions 53a, 53a of the lever members 53, 53, and the driving force required for the actuator 25 decreases. Then, in the slope control unit 34 according to the present embodiment, the second threshold value TH2 is set in response to the decrease in the current value I generated in the motor 24 at this time.

That is, the slope control unit 34 according to the present embodiment detects, based on the comparisons with the first threshold value TH1 and the second threshold value TH2, the increase or decrease in the current value I, that is generated in the motor 24 of the actuator 25, peculiar to the engagement operation of the check mechanism 41. Accordingly, in the slope apparatus 11 according to the present embodiment, it is possible to accurately detect that the check mechanism 41 has shifted to the engagement state by a simple configuration.

As described above, in the slope apparatus 11 according to the present embodiment, the position holding device 70 of the slope plate 10 is formed by the check mechanism 41 configured as described above.

Further, as shown in FIG. 9, in the vehicle 1 according to the present embodiment, optionally, the slope control unit 34 provided in the control device 30 executes an electromagnetic brake control for generating a braking force in the motor 24 of the actuator 25. Accordingly, in the slope apparatus 11 according to the present embodiment, the actuator 25 and the slope control unit 34 which constitute the drive device 71 of the slope plate 10, also have a function as the position holding device 70 of the slope plate 10.

Figure 19:
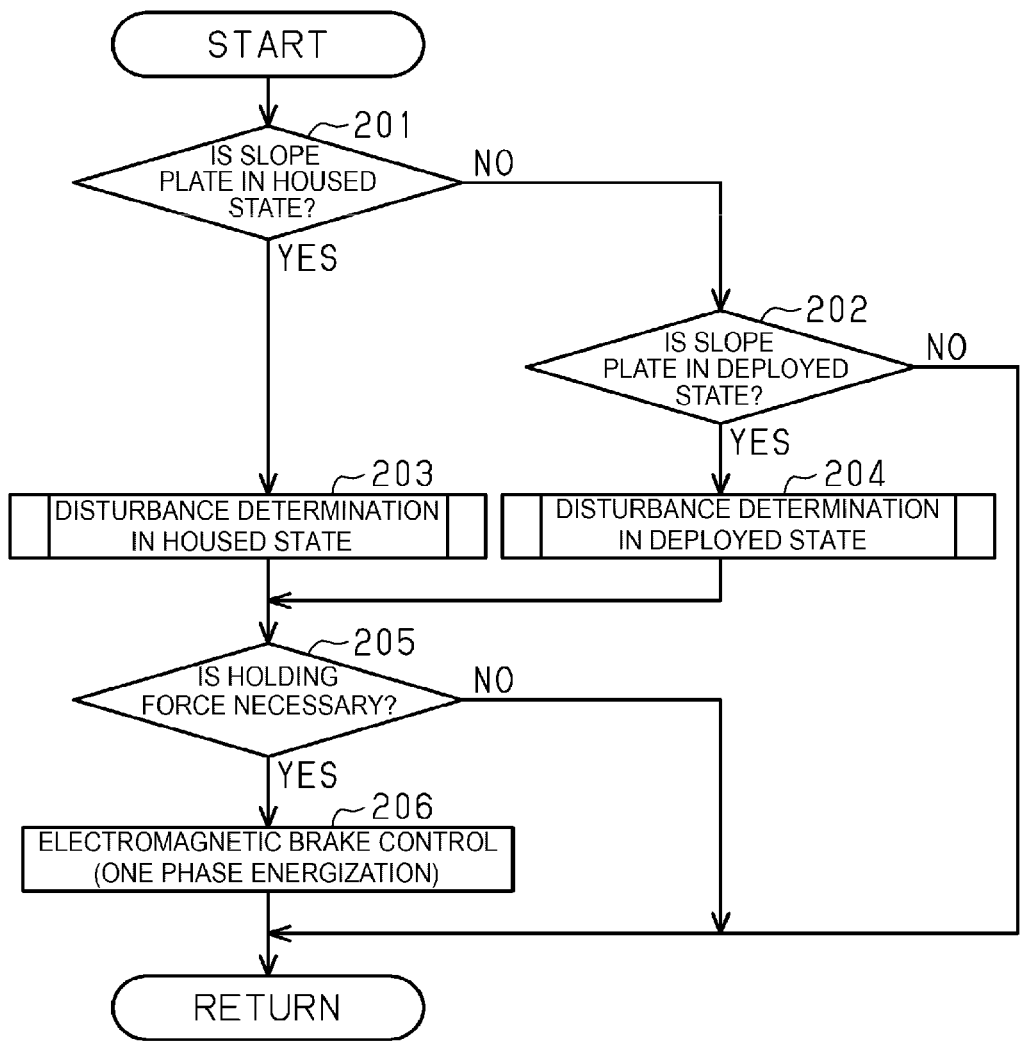
FIG. 19 is a flowchart showing a processing procedure of a position holding control of the slope plate.

In detail, as shown in FIG. 19, the slope control unit 34 according to the present embodiment determines whether the slope plate 10 is at the position where the slope plate 10 is housed in the housing box 13, that is, in the housed state (step 201). Further, the slope control unit 34 determines whether the slope plate 10 is at the position where the slope plate 10 is deployed at the lower end of the door opening portion 3, that is, in the deployed state (step 202). When the slope plate 10 is in the housed state (step 201: YES) or in the deployed state (step 202: YES), the slope control unit 34 executes a disturbance determination (step 203 and step 204). Specifically, in the disturbance determinations in step 203 and step 204, the slope control unit 34 according to the present embodiment determines whether an external force that moves the position of the slope plate 10 acts. Then, the slope control unit 34 according to the present embodiment executes the electromagnetic brake control of the motor 24 (step 206), when a holding force against the external force is necessary, based on results of the disturbance determinations (step 205: YES).

In detail, the slope control unit 34 according to the present embodiment executes, as the electromagnetic brake control, an energization control referred to as so-called "fixed-phase energization" or "one phase energization" in which power is supplied to the motor 24 of the actuator 25 with a fixed energization phase.

Figure 20:
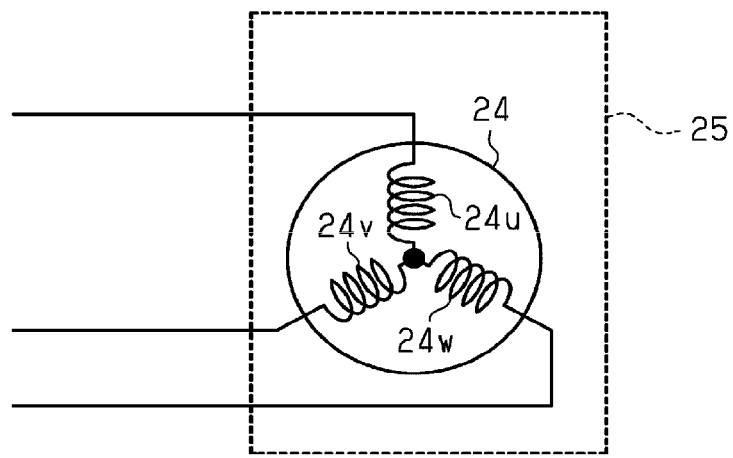
FIG. 20 is a schematic configuration diagram of a brushless motor.

That is, as shown in FIG. 20, in the slope apparatus 11 according to the present embodiment, as the motor 24 of the actuator 25, a brushless motor having three-phase motor coils 24u, 24v, and 24w respectively corresponding to phases of U, V, and W is used. Further, the slope control unit 34 according to the present embodiment sequentially switches energization patterns for the motor coils 24u, 24v, and 24w according to an electrical rotational angle to generate a three-phase drive power, and thereby the motor 24 is rotated.

In addition, the slope control unit 34 according to the present embodiment fixes the energization pattern during execution of the electromagnetic brake control. That is, in the brushless motor, a force that maintains the electrical rotational angle corresponding to the energization pattern is generated by supplying power with the fixed energization phase, for example, to maintain an energization pattern of "U phase→W phase". Accordingly, the slope control unit 34 according to the present embodiment generates a braking force in the motor 24.

Figure 21:
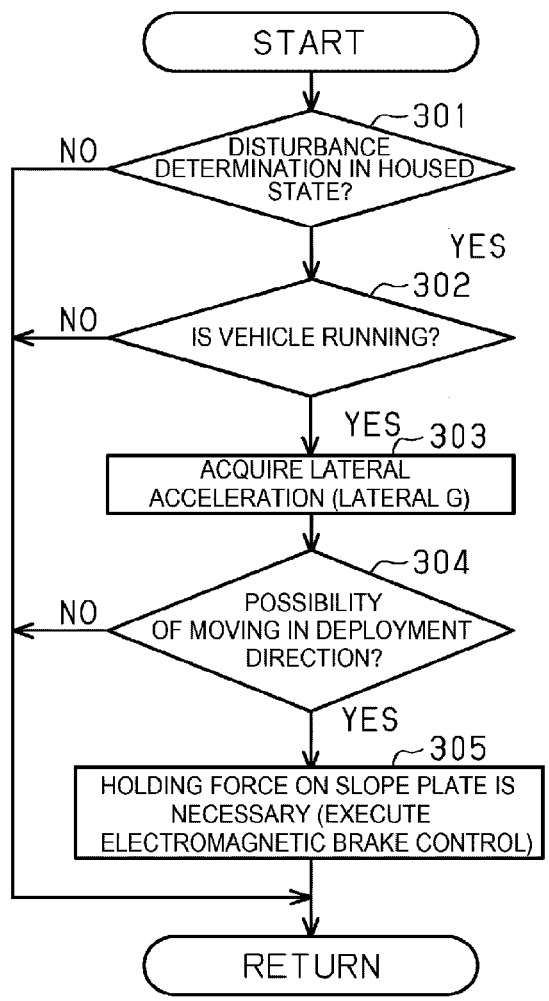
FIG. 21 is a flowchart showing a processing procedure of the position holding control that is executed when the slope plate is in a housed state.

In more detail, as shown in FIG. 21, the slope control unit 34 according to the present embodiment first determines whether the vehicle 1 is running (step 302) in the disturbance determination when the slope plate 10 is in the housed state (step 301: YES). Further, the slope control unit 34 acquires a lateral acceleration of the vehicle 1 (step 303) when the vehicle 1 is running (step 302: YES). Next, the slope control unit 34 determines whether the slope plate 10 housed in the housing box 13 may move in the deployment direction due to an inertial force based on the lateral acceleration, that is, a centrifugal force (step 304). Then, when the slope control unit 34 according to the present embodiment determines that the slope plate 10 may move in the deployment direction in step 304 (step 304: YES), the slope control unit 34 determines that a holding force against the centrifugal force as an external force acting on the slope plate 10 is necessary. That is, the slope control unit 34 determines that the braking force is to be generated in the motor 24 of the actuator 25 by executing the electromagnetic brake control (step 305).

In addition, the slope control unit 34 according to the present embodiment determines that the vehicle is "running" when the speed of the vehicle is equal to or higher than a predetermined speed. The slope control unit 34 determines that the slope plate 10 housed in the housing box 13 "may move in the deployment direction" by determining a direction of the lateral acceleration and comparing a value of the lateral acceleration with a predetermined threshold value. The slope control unit 34 according to the present embodiment does not execute the electromagnetic brake control when the possibility of "moving in the deployment direction" is denied (step 304: NO).

Figure 22:
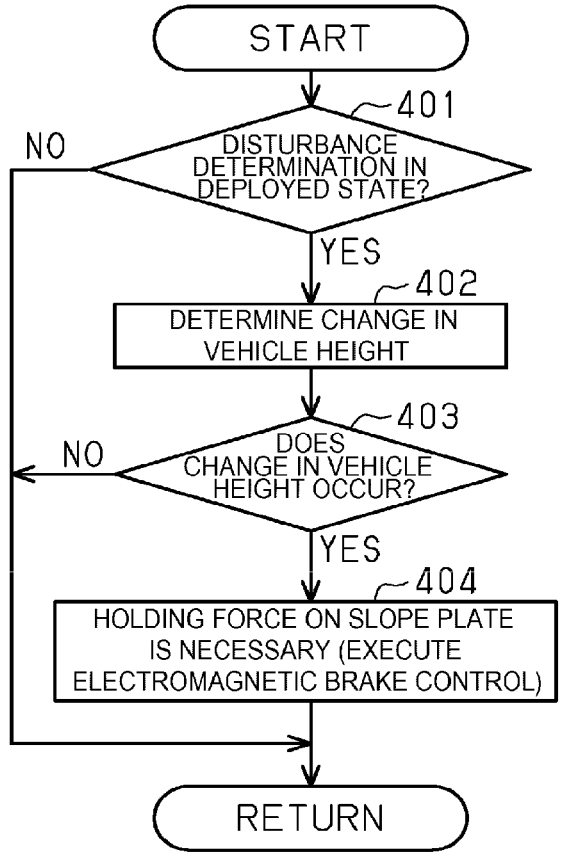
FIG. 22 is a flowchart showing a processing procedure of the position holding control that is executed when the slope plate is in a deployed state.

As shown in FIG. 22, in the disturbance determination when the slope plate 10 is in the deployed state (step 401: YES), a change in the vehicle height in the vehicle 1 is determined (step 402). Specifically, in the vehicle 1 according to the present embodiment, the vehicle heights at a plurality of positions adjusted by the vehicle height adjustment device 39 and the balance thereof are monitored by the vehicle height control unit 40 provided in the control device 30 (see FIG. 9). Accordingly, when it is determined that the vehicle 1 is in a situation where the vehicle height changes (step 403: YES), the slope control unit 34 according to the present embodiment determines that the holding force against the external force acting on the slope plate 10 is necessary based on the change in the vehicle height. That is, the slope control unit 34 determines that the braking force is to be generated in the motor 24 of the actuator 25 by executing the electromagnetic brake control (step 404).

That is, in the slope apparatus 11 according to the present embodiment, the slope plate 10 deployed at the lower end of the door opening portion 3 forms the ramp 12 in a state where the rear end 10r is engaged with the vehicle body 2. Therefore, when the vehicle height changes in the vehicle 1, the rear end 10r of the slope plate 10 engaged with the vehicle body 2 may disengage from the vehicle body 2.

In consideration of this regard, in the slope apparatus 11 according to the present embodiment, the electromagnetic brake control of the motor 24 that is the drive source of the actuator 25 is executed as described above. Further, the movement of the moving members 21 connected to the actuator 25 via the drive cables 26 is restricted based on the braking force of the motor 24 generated in this way. Accordingly, the connecting mechanism 23 interposed between the moving members 21 and the slope plate 10 holds the position of the slope plate 10 whose rear end 10r is lifted up due to the rotation of the support arms 22 (see FIG. 8). In the slope apparatus 11 according to the present embodiment, the position of the slope plate 10 deployed at the lower end of the door opening portion 3 is stably held based on the holding force generated by the execution of the electromagnetic brake control.

Deceleration Control When Slope Plate Is Deployed

Next, a deceleration control function when the slope plate mounted on the slope apparatus according to the present embodiment is deployed will be described.

As shown in FIG. 7, in the slope apparatus 11 according to the present embodiment, the slope plate 10 is moved in the deployment and housing directions along the extending direction of the guide rails 20, 20 based on the driving force of the actuator 25 while maintaining the substantially horizontal posture. Further, during deployment of the slope plate 10, the rear end 10r of the slope plate 10 moving in the deployment direction is separated from front ends 20f, 20f of the guide rails 20, 20, and thus tilting of the slope plate 10 around first connection points X1 with the support arms 22 is allowed. Accordingly, in the slope apparatus 11 according to the present embodiment, a front end 10f of the slope plate 10 contacts the ground due to an own weight (see FIG. 4).

In addition, as shown in FIG. 8, in the slope apparatus 11 according to the present embodiment, after the slope plate 10 contacts the ground, the moving members 21 connected to the slope plate 10 via the support arms 22 further move in the deployment direction. In the slope apparatus 11 according to the present embodiment, the support arms 22 rotate around second connection points X2 with respect to the moving members 21 while the slope plate 10 is further tilted around the first connection points X1 due to the movement of the moving members 21 toward the deployment direction. That is, in the slope apparatus 11 according to the present embodiment, based on the rotation of the support arms 22, the connecting mechanism 23 between the slope plate 10 and the moving members 21 functions as a lift mechanism that lifts up the rear end 10r of the slope plate 10 deployed at the lower end of the door opening portion 3. Accordingly, in the slope apparatus 11 according to the present embodiment, the ramp 12 that is continuous with the door opening portion 3 is formed in a state where the rear end 10r of the slope plate 10 is engaged with the vehicle body 2, more specifically, with the edge portion 28e of the vehicle floor 28.

Further, a sound and a vibration are generated when the slope plate 10 contacts the ground. In consideration of this regard, when the slope plate 10 is driven by the actuator 25 and is deployed at the lower end of the door opening portion 3, the slope control unit 34 according to the present embodiment reduces the moving speed V of the slope plate 10 before the front end 10f of the slope plate 10 contacts the ground. Accordingly, in the slope apparatus 11 according to the present embodiment, the sound and the vibration generated when the slope plate 10 contacts the ground is restricted to be small.

Figure 23:
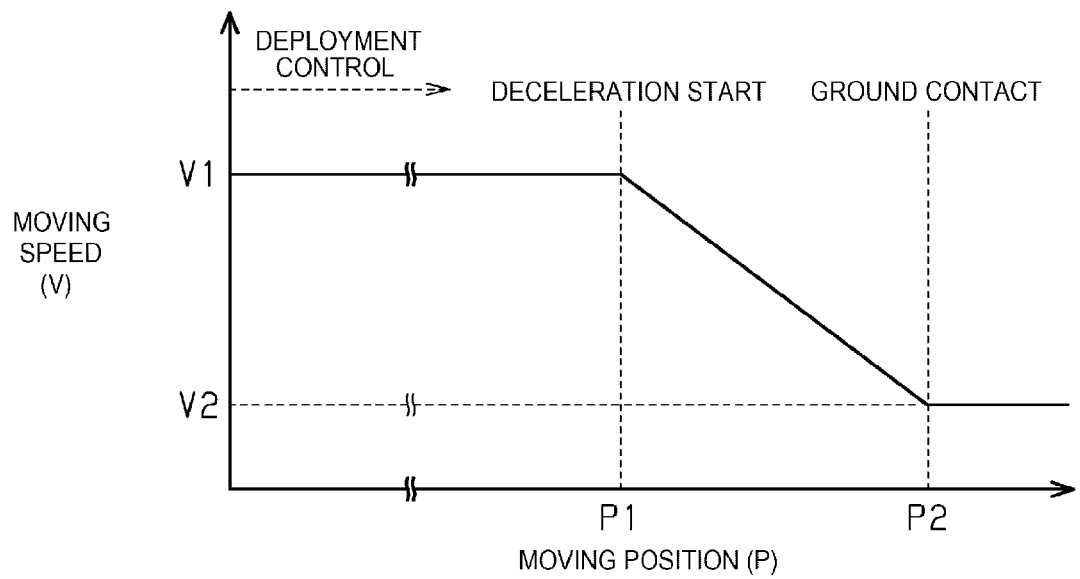
FIG. 23 is a diagram illustrating a deceleration control before ground contact that is executed when the slope plate is deployed.

Specifically, as shown in FIGS. 9 and 23, the slope control unit 34, which constitutes the drive device 71 together with the actuator 25, controls the moving speed V of the slope plate 10 that moves in the deployment direction together with the moving members 21 during deployment control of the slope plate 10 to a predetermined first speed V1. Further, when the slope plate 10 reaches a predetermined deceleration start position P1 set in advance, the slope control unit 34 gradually reduces the moving speed V of the slope plate 10. Accordingly, in the slope apparatus 11 according to the present embodiment, at a ground contact position P2 where the slope plate 10 contacts the ground, the moving speed V of the slope plate 10 is reduced to a predetermined second speed V2 slower than the first speed V1 (V2<V1).

Draining Structure of Actuator

Next, a draining structure of the actuator 25 mounted on the slope apparatus 11 according to the present embodiment will be described.

Figure 24:
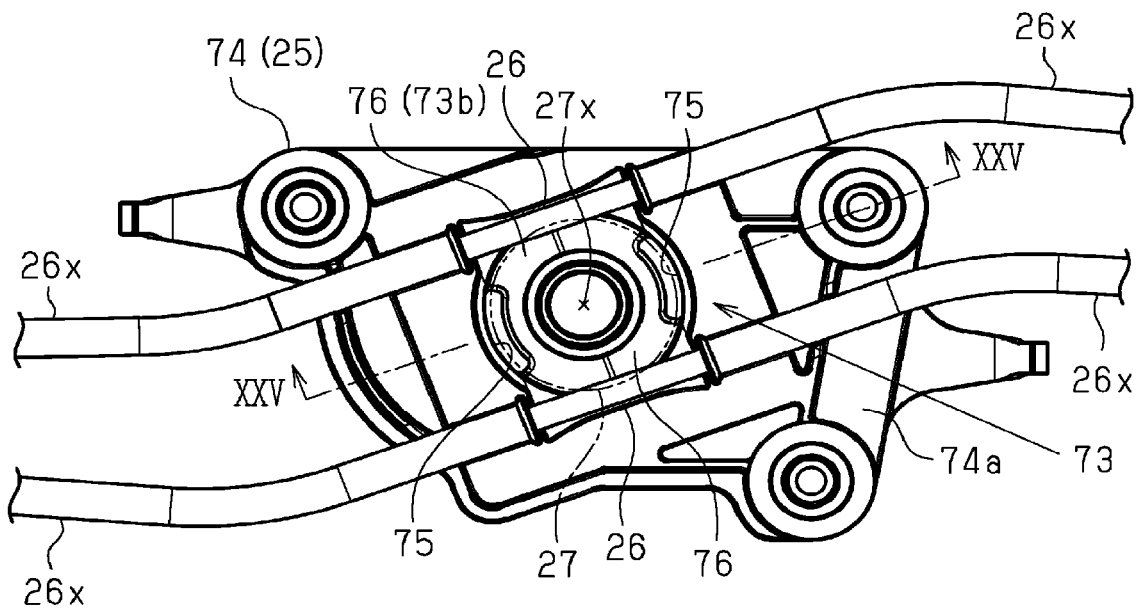
FIG. 24 is a plan view showing an accommodating portion for a drive gear provided on an actuator.
Figure 25:
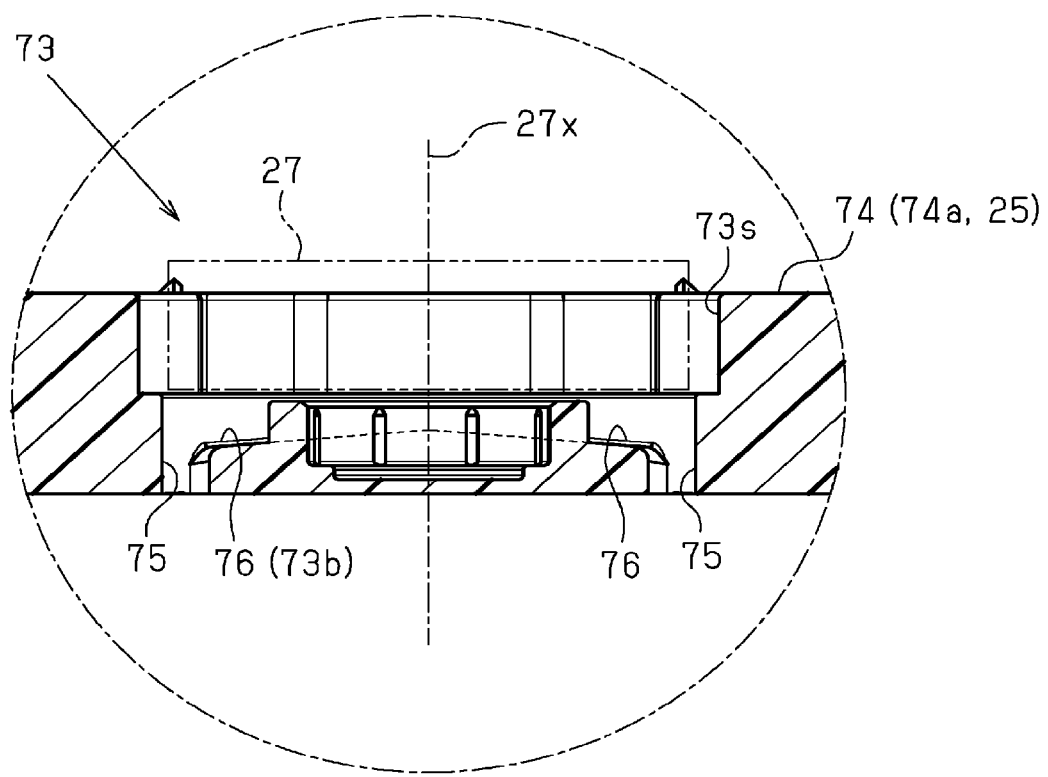
FIG. 25 is a cross-sectional view of the accommodating portion.

As shown in FIGS. 24 and 25, the actuator 25 according to the present embodiment includes an accommodating portion 73 for the drive gear 27 provided inside a case 72 (see FIG. 10). Specifically, in the actuator 25 according to the present embodiment, the accommodating portion 73 for the drive gear 27 has a substantially circular recessed shape that is recessed in an upper surface 74a of a housing member 74 having a substantially flat plate shape and opens upward. Further, in the actuator 25 according to the present embodiment, the drive gear 27 provided inside the accommodating portion 73 is rotationally driven by the motor 24 which is the drive source.

Further, in the accommodating portion 73, two drive cables 26, 26 introduced in the case 72 of the actuator 25 are inserted substantially in parallel at two positions sandwiching a rotation center 27x of the drive gear 27. Accordingly, in the actuator 25 according to the present embodiment, the drive gear 27 disposed in the accommodating portion 73 meshes with the drive cables 26, 26.

In addition, the accommodating portion 73 is provided with a pair of drain holes 75, 75 penetrating a bottom surface 73b of the accommodating portion 73. Accordingly, in the actuator 25 according to the present embodiment, for example, drainage water in the accommodating portion 73 for the drive gear 27 generated due to wetting, dew condensation or the like is drained to the outside of the case 72 through the drain holes 75, 75.

Specifically, the drain holes 75, 75 respectively have an elongated hole shape extending in a substantially arc shape along a peripheral wall 73s of the accommodating portion 73 at two positions sandwiching the rotation center 27x of the drive gear 27. Further, in the vehicle 1 according to the present embodiment, the drain holes 75, 75 are disposed in the front-rear direction of the vehicle when the slope apparatus 11 is housed into the housing box 13. Accordingly, in the actuator 25 according to the present embodiment, the drainage water can be efficiently drained from the drain holes 75, 75 by accelerating and decelerating the vehicle 1.

Further, the accommodating portion 73 for the drive gear 27 is provided with an inclined surface 76 that guides the drainage water to the drain holes 75, 75. Specifically, in the actuator 25 according to the present embodiment, the bottom surface 73b of the accommodating portion 73 has an uneven shape in which the two positions where the drain holes 75, 75 are provided are set as "valleys", and two positions deviated by approximately 90 degrees in the circumferential direction from these "valleys" are set as "mountains". Accordingly, the accommodating portion 73 according to the present embodiment is provided with the inclined surface 76 that guides the drainage water to the drain holes 75, 75 so as to surround the drain holes 75, 75.

Next, operations of the present embodiment will be described.

That is, in the slope apparatus 11, when the slope plate 10 is at the position where the slope plate 10 is housed in the housing box 13 as the housing portion provided in the vehicle body 2, or at the position where the slope plate 10 is deployed at the lower end of the door opening portion 3, the position holding device 70 operates. Accordingly, the position of the slope plate 10 is held against the external force acting on the slope plate 10.

Next, effects according to the present embodiment will be described.

(1) The slope apparatus 11 includes the slope plate 10 that is moved in the deployment direction so as to be deployed at the lower end of the door opening portion 3 and is moved in the housing direction so as to be housed in the housing box 13 as the housing portion provided in the vehicle body 2. The slope apparatus 11 further includes the position holding device 70 that holds the position of the slope plate 10 against the external force. Accordingly, the position of the slope plate 10 provided movably in the deployment and housing directions can be stably held.

(2) The slope apparatus 11 includes, as the position holding device 70, the check mechanism 41 that holds the position of the slope plate 10 by engagement of the slope side check 43 provided on the slope plate 10 and the vehicle body side check 44 provided on the vehicle body 2. The slope apparatus 11 holds, based on the engagement force of the check mechanism 41, the slope plate 10 at the position where the slope plate 10 is housed in the housing box 13.

According to the above configuration, the slope plate 10 housed in the housing box 13 can be prevented from being moved in the deployment direction by the external force. Accordingly, the high reliability and safety can be ensured.

(3) The vehicle body side check 44 includes the pair of lever members 53, 53 disposed adjacently and rotatably to extend in the deployment and housing directions of the slope plate 10. Further, the vehicle body side check 44 includes the compression coil spring 57 as the urging member 56 that urges the lever members 53, 53 to rotate the lever members 53, 53 in the direction where the engagement portions 58, 58 are close to each other. The slope side check 43 includes the engagement protrusion 50 that is inserted between the engagement portions 58, 58 of the lever members 53, 53 based on the movement of the slope plate 10 toward the housing direction.

According to the above configuration, the engagement protrusion 50 of the slope side check 43 is inserted between the pair of lever members 53, 53 that constitute the vehicle body side check 44 while pushing and expanding the gap between the engagement portions 58, 58 against the urging force of the compression coil spring 57. Further, based on the urging force of the compression coil spring 57, the lever members 53, 53 sandwich the engagement protrusion 50 of the slope side check 43 inserted between the engagement portions 58, 58 so as to generate an engagement force. Accordingly, the slope side check 43 and the vehicle body side check 44 can be engaged smoothly and stably.

In addition, when the engagement protrusion 50 of the slope side check 43 is inserted between the pair of lever members 53, 53 constituting the vehicle body side check 44, even when the positional deviation occurs, the positional deviation can be absorbed due to the independent rotation of the lever members 53, 53. Accordingly, a smooth operation of the engagement protrusion can be ensured.

(4) The engagement protrusion 50 includes the wedge-shaped portion 59 that gradually increases in width from the tip end 50*a* toward the base end 50*b*, and the constricted portion 60 that is continuous with the wedge-shaped portion 59 and gradually narrows in width. Further, the engagement portions 58, 58 of the lever members 53, 53 are provided with the protruding portions 63, 63 that protrude in the direction toward each other and are engaged with the constricted portion 60 of the engagement protrusion 50.

According to the above configuration, a high engagement force can be generated by the engagement between the constricted portion 60 and the protruding portions 63, 63. In particular, the wide portion of the wedge-shaped portion 59 is located closer to the tip end 50*a* side of the engagement protrusion 50 than the constricted portion 60 to be engaged with the protruding portions 63, 63, and thus the force required to move the engagement protrusion 50 in the deployment direction against the compression coil spring 57 increases. Accordingly, the slope plate 10 can be more stably held at the position where the slope plate 10 is housed in the housing box 13 based on the engagement force between the slope side check 43 and the vehicle body side check 44.

(5) The slope apparatus 11 includes the actuator 25 that uses the motor 24 as the drive source and moves the slope plate 10 in the deployment and housing directions. Further, the operations of the actuator 25 are controlled by the slope control unit 34 provided on the control device 30. The slope control unit 34 monitors the current change in the motor 24 during the housing control of the slope plate 10. The slope control unit 34 as an engagement detection device 80 detects, based on the current change in the motor 24, that the check mechanism 41 has shifted to the engagement state where the engagement force is generated.

That is, during the engagement operation between the slope side check 43 and the vehicle body side check 44, the driving force required for the actuator 25 constituting the drive device 71 changes. Accordingly, the current value I of the motor 24 that is the drive source also changes. Therefore, according to the above configuration, a state where the position of the slope plate 10 is held based on the engagement force of the check mechanism 41 can be confirmed by a simple configuration.

(6) The slope control unit 34, which constitutes the drive device 71 of the slope plate 10 together with the actuator 25, functions as the position holding device 70 by executing the electromagnetic brake control that generates the braking force in the motor 24. Accordingly, the position of the slope plate 10 can be stably held by a simple configuration.

(7) The motor 24 has a configuration as the brushless motor having the three-phase motor coils 24*u*, 24*v*, and 24*w*. The slope control unit 34 executes the energization control in which the energization phase of the motor 24 is fixed as the electromagnetic brake control.

That is, the force for maintaining the electrical rotational angle corresponding to the energization phase is generated in the motor 24 by executing the energization control that is called so-called "fixed-phase energization" or "one phase energization". Accordingly, the position of the slope plate 10 can be stably held by using the braking force generated in the motor 24.

(8) The slope control unit 34 executes the electromagnetic brake control at the position where the slope plate 10 is housed in the housing box 13.

According to the above configuration, the slope plate 10 housed in the housing box 13 can be prevented from being moved in the deployment direction by the external force. Accordingly, the high reliability can be ensured.

(9) The slope control unit 34 acquires the lateral acceleration of the vehicle 1, and determines whether the slope plate 10 housed in the housing box 13 may move in the deployment direction due to the centrifugal force based on the lateral acceleration. Then, when the slope control unit 34 determines that the holding force against the centrifugal force as the external force acting on the slope plate 10 is necessary, that is, when the external force in the direction where the slope plate 10 is moved in the deployment direction acts, the slope control unit 34 executes the electromagnetic brake control. Accordingly, the heat generation of the motor 24 can be restricted and the position of the slope plate 10 can be effectively held.

(10) The slope control unit 34 executes the electromagnetic brake control at the position where the slope plate 10 is deployed at the lower end of the door opening portion 3. Accordingly, the position of the slope plate 10 deployed at the lower end of the door opening portion 3 can be stably held.

(11) The slope plate 10 forms the ramp 12 continuous with the door opening portion 3 in the state where the rear end 10*r* is engaged with the vehicle body 2, specifically, with the edge portion 28*e* of the vehicle floor 28. Then, in a case where the slope plate 10 is at the deployed position, the slope control unit 34 executes the electromagnetic brake control when the vehicle height changes in the vehicle 1.

That is, the rear end 10*r* of the slope plate 10 engaged with the vehicle body 2 may be detached due to the change in the vehicle height in the vehicle 1. However, according to the above configuration, the position of the slope plate 10 deployed at the lower end of the door opening portion 3 can be stably held based on the braking force generated by the motor 24 due to the execution of the electromagnetic brake control. Accordingly, the high reliability and safety can be ensured.

(12) At the time of the deployment control in which the slope plate 10 is driven and is deployed at the lower end of the door opening portion 3, the slope control unit 34 reduces the moving speed V of the slope plate 10 before the front end 10*f* of the slope plate 10 contacts the ground. Accordingly, the sound and the vibration generated when the slope plate 10 contacts the ground can be restricted to be small.

(13) The actuator 25 includes the drive gear 27 that is rotationally driven by the motor 24 while meshing with the drive cables 26, and the accommodating portion 73 that rotatably accommodates the drive gear 27. Further, the accommodating portion 73 is provided with the drain holes 75 and the inclined surface 76 that guides drainage water to the drain holes 75.

According to the above configuration, for example, drainage water in the accommodating portion 73 for the drive gear 27 generated due to wetting, dew condensation or the like can be drained to the outside through the drain holes 75. Further, the drainage water in the accommodating portion 73 can be collected to the drain holes 75 by the inclined surface 76. Accordingly, the drainage water in the accommodating portion 73 can be effectively drained to the outside.

The above embodiment can be modified and implemented as follows. The above embodiment and the following modifications can be implemented in combination with each other within a technically consistent range.

In the above embodiment, the slope apparatus 11 includes, as the position holding device 70 of the slope plate 10, the check mechanism 41 that holds the slope plate 10 at the position where the slope plate 10 is housed in the housing box 13. However, the present disclosure is not limited thereto, and the position where the check mechanism 41 is provided, for example, the position where the slope plate 10 deployed at the lower end of the door opening portion 3 is held may be set to any position.

The configuration of the check mechanism 41 may be changed optionally. For example, the shape of the engagement protrusion 50 of the check member 47 constituting the slope side check 43 may be changed optionally. Further, for example, the shape of the lever members 53, 53 constituting the vehicle body side check 44 may be changed optionally. The urging member 56 of the lever members 53, 53 is not limited to the compression coil spring 57, and may be changed optionally. In addition, the check mechanism 41 that uses an engagement portion different from the check member 47 having such an engagement protrusion 50 and the two lever members 53, 53 may be adopted. Further, a configuration including a latch mechanism as the position holding device 70 may be adopted.

In the above embodiment, it is confirmed that the check mechanism 41 has shifted to the engagement state by detecting the current value I smaller than the predetermined second threshold value TH2 after detecting the current value I of the motor 24 larger than the predetermined first threshold value TH1. However, the present disclosure is not limited thereto, and the method for detecting that the check mechanism 41 has shifted to the engagement state based on the current change in the motor 24 may be changed optionally. For example, only the comparison with the first threshold value TH1 may be performed. Further, a condition that the current value I of the motor 24 continuously decreases a plurality of times after the current value I exceeds the first threshold value TH1, or that the current value I decreases to a predetermined ratio from a time when the current value I first exceeds the first threshold value TH1 may be set as a condition for confirming the engagement state. Then, a condition that the current value I of the motor 24 continuously increases a plurality of times after the moving position P of the slope plate 10 enters the engagement operation range a may be set as a condition for confirming the engagement state.

In the above embodiment, the electromagnetic brake control is executed when it is determined that the holding force against the centrifugal force as the external force acting on the slope plate 10 is necessary by the detection of the lateral acceleration in a case where the vehicle 1 is running. However, the present disclosure is not limited thereto, and a configuration may be adopted in which the electromagnetic brake control for holding the slope plate 10 at the position where the slope plate 10 is housed in the housing box 13 is executed even when the vehicle 1 is stopped. For example, a configuration may be adopted in which the electromagnetic brake control for preventing the movement of the slope plate 10 in the deployment direction due to the own weight is executed by detecting the inclination of the vehicle 1. Further, for example, a configuration may be adopted in which when the vehicle 1 collides with another vehicle, the electromagnetic brake control is executed in order to prevent the slope plate 10 from moving in the deployment direction due to an acceleration generated by the collision.

In the above embodiment, in the case where the slope plate 10 is at the deployed position, the electromagnetic brake control is executed when the vehicle height changes in the vehicle 1. Further, the situation that the vehicle height changes in the vehicle 1 is detected by monitoring the vehicle heights at a plurality of positions adjusted by the vehicle height adjustment device 39 provided on the vehicle 1 and the balance thereof. However, the present disclosure is not limited thereto, and for example, an entry/exit state such as the number of occupants using the door opening portion 3 provided with the slope plate 10 and the moving speed is detected by, for example, analyzing the captured image Vd of the camera 35. Accordingly, a configuration may be adopted in which the situation that the vehicle height changes in the vehicle 1 is predicted and then the electromagnetic brake control is executed.

In the above embodiment, when the slope plate 10 is in the housed state, or when the slope plate 10 is in the deployed state, it is determined whether the external force that moves the position of the slope plate 10 acts by executing the disturbance determination. Then, when the holding force against the external force is necessary, the electromagnetic brake control is executed. However, the present disclosure is not limited thereto, and a configuration may be adopted in which the electromagnetic brake control is executed when the slope plate 10 is in the housed state or in the deployed state without executing such a disturbance determination.

Further, a configuration may be adopted in which the electromagnetic brake control is executed in any one of the cases where the slope plate 10 is in the housed state and where the slope plate 10 is in the deployed state. In a configuration in which the slope plate 10 before forming the ramp 12 at the lower end of the door opening portion 3 can be used as a step, the electromagnetic brake control for holding a position of the slope plate 10 functioning as the step may be executed.

In the above embodiment, as the electromagnetic brake control, the energization control which is referred to as so-called "fixed-phase energization" or "one phase energization" and in which the energization phase of the motor 24 is fixed is executed. However, the present disclosure is not limited thereto, and a configuration may be adopted in which a regeneration brake control is executed as the electromagnetic brake control. A mode of the regeneration brake control in such a case may be a configuration in which a regenerative current generated in the motor coils is regenerated in a battery, or may be a so-called short brake control in which the motor coils are short-circuited and are internally consumed. In addition, the heat generation of the motor 24 can be restricted by adopting such a regeneration brake control.

In the above embodiment, the moving speed V of the slope plate 10 is reduced to the predetermined second speed V2 before the front end 10f contacts the ground at the time of the deployment control of the slope plate 10. However, the present disclosure is not limited thereto, and a configuration may be adopted in which the moving speed V reduced before the front end 10f contacts the ground is set according to the vehicle height at the time of deployment control. That is, the higher the vehicle height, the greater the sound and the vibration generated when the front end 10f of the slope plate 10 contacts the ground. Therefore, for example, a configuration may be adopted in which the higher the vehicle height at the time of deployment control, the more the moving speed V of the slope plate 10 is reduced before the front end 10f contacts the ground. Further, for example, the lower the vehicle height at the time of deployment control, the later a deceleration start timing may be delayed. By adopting such a configuration, it is possible to achieve both improved quality including quietness and rapid deployment of the slope plate 10.

In the above embodiment, the support arms 22 rotate around the second connection points X2 with respect to the moving members 21, and thus the rear end 10r of the slope plate 10 deployed at the lower end of the door opening portion 3 is lifted up. Accordingly, the slope plate 10 forms the ramp 12 continuous with the door opening portion 3 in the state where the rear end 10r is engaged with the vehicle body 2. However, the present disclosure is not limited thereto, and the configuration in which the slope plate 10 deployed at the lower end of the door opening portion 3 forms the ramp 12 may be changed optionally. For example, a configuration may be adopted in which the front end 10f of the slope plate 10 deployed at the lower end of the door opening portion 3 simply contacts the ground by the own weight, and thus the slope plate 10 forms the ramp 12.

In addition, the configuration of the drive device 71 that moves the slope plate 10 in the deployment and housing directions using the motor 24 as the drive source may be changed optionally. However, a configuration is desired in which the position of the slope plate 10 is held by executing the electromagnetic brake control. Regarding the check mechanism 41 that holds the slope plate 10 at the position where the slope plate 10 is housed in the housing box 13, a configuration in which the motor 24 is not used as the drive source, for example, a configuration in which the slope plate 10 is manually moved in the deployment and housing directions may be adopted.

Next, technical ideas that can be understood from the above embodiment and modifications will be described.

(A) The vehicle slope apparatus is characterized in that the drive device executes the regeneration brake control of the motor as the electromagnetic brake control. Accordingly, the electromagnetic brake control can be executed while restricting the heat generation of the motor.

According to an aspect of this disclosure, a vehicle slope apparatus includes a slope plate configured to be moved in a deployment direction so as to be deployed at a lower end of a door opening portion and configured to be moved in a housing direction so as to be housed in a housing portion provided in a vehicle body; and a position holding device configured to hold a position of the slope plate against an external force.

According to the above configuration, the position of the slope plate provided movably in the deployment and housing directions can be stably held.

In the vehicle slope apparatus according to the above aspect, the position holding device preferably includes a check mechanism configured to hold the slope plate at a position where the slope plate is housed in the housing portion, based on an engagement force between a slope side check provided on the slope plate and a vehicle body side check provided on the vehicle body.

According to the above configuration, the slope plate housed in the housing portion can be prevented from being moved in the deployment direction by the external force. Accordingly, high reliability can be ensured.

In the vehicle slope apparatus according to the above aspect, it is preferable that the vehicle body side check includes a pair of lever members disposed adjacently and rotatably to extend in the deployment and housing directions of the slope plate, and an urging member configured to urge the lever members to rotate the lever members in a direction where engagement portions thereof are close to each other, and the slope side check includes an engagement protrusion configured to be inserted between the two engagement portions based on movement of the slope plate toward the housing direction.

According to the above configuration, the engagement protrusion of the slope side check is inserted between the pair of lever members that constitute the vehicle body side check while pushing and expanding a gap between the engagement portions against an urging force of the urging member. Further, based on the urging force of the urging member, the lever members sandwich the engagement protrusion of the slope side check inserted between the engagement portions so as to generate an engagement force. Accordingly, the slope side check and the vehicle body side check can be engaged smoothly and stably.

In addition, when the engagement protrusion of the slope side check is inserted between the pair of lever members constituting the vehicle body side check, even when a positional deviation occurs, the positional deviation can be absorbed due to independent rotation of the lever members. Accordingly, a smooth operation of the engagement protrusion can be ensured.

In the vehicle slope apparatus according to the above aspect, it is preferable that the engagement protrusion includes a wedge-shaped portion that gradually increases in width from a tip end toward a base end, and a constricted portion that is continuous with the wedge-shaped portion and gradually narrows in width, and the engagement portions of the lever members are respectively provided with protruding portions which protrude in a direction toward each other and which are configured to be engaged with the constricted portion of the engagement protrusion.

According to the above configuration, a high engagement force can be generated by the engagement between the constricted portion and the protruding portions. In particular, since a wide portion of the wedge-shaped portion is located closer to a tip end side of the engagement protrusion than the constricted portion to be engaged with the protruding portions, a force required to move the engagement protrusion in the deployment direction against the urging force of the urging member increases. Accordingly, the slope plate can be more stably held at the position where the slope plate is housed in the housing portion based on the engagement force between the slope side check and the vehicle body side check.

The vehicle slope apparatus according to the above aspect preferably includes a drive device configured to move the slope plate in the housing direction using a motor as a drive source; and an engagement detection device configured to detect, based on a current change in the motor, that the check mechanism has shifted to an engagement state where the engagement force is generated.

That is, during the engagement operation between the slope side check and the vehicle body side check, the driving force required for the drive device changes. Accordingly, a current value of the motor that is the drive source also changes. Therefore, according to the above configuration, a state where the position of the slope plate is held based on the engagement force of the check mechanism can be confirmed by a simple configuration.

It is preferable that the vehicle slope apparatus according to the above aspect includes a drive device configured to move the slope plate in deployment and housing directions using a motor as a drive source, and the position holding device is configured to hold the position of the slope plate by the drive device executing an electromagnetic brake control for generating a braking force in the motor.

According to the above configuration, the position of the slope plate can be stably held by a simple configuration.

In the vehicle slope apparatus according to the above aspect, the drive device preferably executes an energization control in which an energization phase of the motor is fixed as the electromagnetic brake control.

That is, a force for maintaining an electrical rotational angle corresponding to the energization phase is generated in the motor by executing the energization control that is called so-called "fixed-phase energization" or "one phase energization". Accordingly, the position of the slope plate can be stably held by using the braking force generated in the motor.

In the vehicle slope apparatus according to the above aspect, the position holding device is preferably configured such that the drive device executes the electromagnetic brake control at a position where the slope plate is housed in the housing portion.

According to the above configuration, the slope plate housed in the housing portion can be prevented from being moved in the deployment direction by the external force. Accordingly, the high reliability and safety can be ensured.

In the vehicle slope apparatus according to the above aspect, the position holding device preferably executes the electromagnetic brake control when the external force in a direction where the slope plate housed in the housing portion is moved in the deployment direction acts.

According to the above configuration, the heat generation of the motor can be restricted and the slope plate can be effectively held at the position where the slope plate is housed in the housing portion.

In the vehicle slope apparatus according to the above aspect, the position holding device is preferably configured such that the drive device executes the electromagnetic brake control at a position where the slope plate is deployed.

According to the above configuration, the position of the slope plate deployed at the lower end of the door opening portion can be stably held.

In the vehicle slope apparatus according to the above aspect, it is preferable that the slope plate is deployed in a state where a rear end of the slope plate is engaged with the vehicle body, and the position holding device is configured such that in a case where the slope plate is at the deployed position, the drive device executes the electromagnetic brake control when a vehicle height changes in the vehicle.

That is, the rear end of the slope plate engaged with the vehicle body may be detached due to the change in the vehicle height in the vehicle. However, according to the above configuration, the position of the slope plate deployed at the lower end of the door opening portion can be stably held based on the braking force generated by the motor due to the execution of the electromagnetic brake control. Accordingly, the high reliability and safety can be ensured.

It is preferable that the vehicle slope apparatus according to the above aspect includes a drive device configured to move the slope plate in deployment and housing directions using a motor as a drive source, and when the drive device drives the slope plate to deploy the slope plate at the lower end of the door opening portion, the drive device reduces a moving speed of the slope plate before a front end of the slope plate contacts ground.

According to the above configuration, a sound and a vibration generated when the slope plate contacts the ground can be restricted to be small.

It is preferable that the vehicle slope apparatus according to the above aspect includes an actuator configured to apply a driving force to the slope plate via a drive cable, the actuator includes a drive gear configured to be rotationally driven while meshing with the drive cable, and an accommodating portion that rotatably accommodates the drive gear, and the accommodating portion is provided with a drain hole and an inclined surface that guides drainage water to the drain hole.

According to the above configuration, for example, drainage water in the accommodating portion for the drive gear generated due to wetting, dew condensation or the like can be drained to the outside through the drain hole. Further, the drainage water in the accommodating portion can be collected in the drain hole by the inclined surface. Accordingly, the drainage water in the accommodating portion can be effectively drained to the outside.

According to the disclosure, the position of the slope plate can be stably held.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle slope apparatus comprising:
   a slope plate configured to be moved in a deployment direction so as to be deployed at a lower end of a door opening portion and configured to be moved in a housing direction so as to be housed in a housing portion provided in a vehicle body; and
   a position holding device configured to hold a position of the slope plate against an external force, wherein
   the position holding device includes a check mechanism configured to hold the slope plate at a position where the slope plate is housed in the housing portion, based on an engagement force between a slope side check provided on the slope plate and a vehicle body side check provided on the vehicle body,
   the vehicle body side check includes:
      a pair of lever members disposed adjacently and rotatably to extend in the deployment and housing directions of the slope plate, and
      an urging member configured to urge the lever members to rotate the lever members in a direction where engagement portions thereof are close to each other, and the slope side check includes:
      an engagement protrusion configured to be inserted between the two engagement portions based on movement of the slope plate toward the housing direction.

2. The vehicle slope apparatus according to claim 1, wherein
   the engagement protrusion includes:
      a wedge-shaped portion that gradually increases in width from a tip end toward a base end, and
      a constricted portion that is continuous with the wedge-shaped portion and gradually narrows in width, and
   the engagement portions of the lever members are respectively provided with protruding portions which protrude in a direction toward each other and which are configured to be engaged with the constricted portion of the engagement protrusion.

3. The vehicle slope apparatus according to claim 1, further comprising:

a drive device configured to move the slope plate in the housing direction using a motor as a drive source; and an engagement detection device configured to detect, based on a current change in the motor, that the check mechanism has shifted to an engagement state where the engagement force is generated.

4. The vehicle slope apparatus according to claim 1, further comprising:

a drive device configured to move the slope plate in deployment and housing directions using a motor as a drive source, wherein the position holding device is configured to hold the position of the slope plate by the drive device executing an electromagnetic brake control for generating a braking force in the motor.

5. The vehicle slope apparatus according to claim 4, wherein the drive device executes an energization control in which an energization phase of the motor is fixed as the electromagnetic brake control.

6. The vehicle slope apparatus according to claim 4, wherein the position holding device is configured such that the drive device executes the electromagnetic brake control at a position where the slope plate is housed in the housing portion.

7. The vehicle slope apparatus according to claim 6, wherein the position holding device executes the electromagnetic brake control when the external force acts in a direction when the slope plate housed in the housing portion is moved in the deployment direction.

8. The vehicle slope apparatus according to claim 4, wherein the position holding device is configured such that the drive device executes the electromagnetic brake control at a position where the slope plate is deployed.

9. The vehicle slope apparatus according to claim 8, wherein the slope plate is deployed in a state where a rear end of the slope plate is engaged with the vehicle body, and the position holding device is configured such that in a case where the slope plate is at a deployed position, the drive device executes the electromagnetic brake control when a vehicle height changes in the vehicle.

10. The vehicle slope apparatus according to claim 1, further comprising:

a drive device configured to move the slope plate in deployment and housing directions using a motor as a drive source, wherein when the drive device drives the slope plate to deploy the slope plate at the lower end of the door opening portion, the drive device reduces a moving speed of the slope plate before a front end of the slope plate contacts ground.

11. The vehicle slope apparatus according to claim 1, further comprising:

an actuator configured to apply a driving force to the slope plate via a drive cable, wherein the actuator includes:

a drive gear configured to be rotationally driven while meshing with the drive cable; and an accommodating portion that rotatably accommodates the drive gear, and the accommodating portion is provided with a drain hole and an inclined surface that guides drainage water to the drain hole.

* * * * *